US009201781B2

(12) United States Patent  (10) Patent No.: US 9,201,781 B2
Asai  (45) Date of Patent: Dec. 1, 2015

(54) DATA PROCESSING APPARATUS, DATA PROCESSING METHOD AND DATA SHARING SYSTEM

(75) Inventor: Koji Asai, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 557 days.

(21) Appl. No.: 13/522,397

(22) PCT Filed: Feb. 10, 2012

(86) PCT No.: PCT/JP2012/000898
§ 371 (c)(1),
(2), (4) Date: Jul. 16, 2012

(87) PCT Pub. No.: WO2012/124251
PCT Pub. Date: Sep. 20, 2012

(65) Prior Publication Data
US 2013/0057770 A1  Mar. 7, 2013

(30) Foreign Application Priority Data
Mar. 16, 2011 (JP) ................ 2011-057643

(51) Int. Cl.
*G06F 12/06* (2006.01)
*G06F 12/02* (2006.01)
*G06T 1/60* (2006.01)
*G06F 12/00* (2006.01)

(52) U.S. Cl.
CPC ............ *G06F 12/0223* (2013.01); *G06F 12/00* (2013.01); *G06F 12/02* (2013.01); *G06F 12/06* (2013.01); *G06T 1/60* (2013.01)

(58) Field of Classification Search
CPC ......... G06F 12/00; G06F 12/02; G06F 12/06; G06T 1/60
USPC .......... 345/501, 502, 530, 531, 536, 564, 572
See application file for complete search history.

(56) References Cited

U.S. PATENT DOCUMENTS 4,965,751 A * 10/1990 Thayer et al. ................ 345/572
6,215,507 B1 * 4/2001 Nally et al. .................. 345/568
(Continued)

FOREIGN PATENT DOCUMENTS

JP   5-128241    5/1993
JP   2004-518343   6/2004
(Continued)

*Primary Examiner* — Joni Richer
(74) *Attorney, Agent, or Firm* — Wenderoth, Lind & Ponack, L.L.P.

(57) ABSTRACT

In order to realize efficient memory access, addresses in the same bank in a memory are consecutively accessed. A data processing apparatus performs mapping so as to store data, which are the same data, with use of the first arrangement and the second arrangement, respectively, in different memory areas constituting a memory. When reading a portion of the data, a selecting unit selects one of the arrangements that is more efficient in accessing the portion of the data based on an address range corresponding to the portion of the data according to each arrangement, and an access control unit accesses a memory area corresponding to the selected arrangement. The data is mapped to a position different from a position of the data in terms of relative positions with respect to boundary addresses of blocks each corresponding to the same row address in the same bank.

15 Claims, 14 Drawing Sheets

(56) References Cited

U.S. PATENT DOCUMENTS

| | | | |
|---|---|---|---|
| 6,674,443 B1 * | 1/2004 | Chowdhuri et al. | 345/557 |
| 6,956,579 B1 * | 10/2005 | Diard et al. | 345/537 |
| 7,990,391 B2 * | 8/2011 | Radke | 345/543 |
| 8,817,033 B2 * | 8/2014 | Hur et al. | 345/540 |
| 2002/0135589 A1 | 9/2002 | Jaspers | |
| 2005/0152211 A1 | 7/2005 | Henmi et al. | |
| 2009/0254700 A1 | 10/2009 | Henmi et al. | |
| 2009/0287850 A1 | 11/2009 | Furukawa et al. | |
| 2010/0077156 A1 | 3/2010 | Mochida | |
| 2011/0167211 A1 | 7/2011 | Henmi et al. | |

FOREIGN PATENT DOCUMENTS

| | | |
|---|---|---|
| JP | 2005-196485 | 7/2005 |
| JP | 2011-39660 | 2/2011 |
| WO | 2007/116612 | 10/2007 |
| WO | 2009/116279 | 9/2009 |
| WO | 2010/086919 | 8/2010 |

* cited by examiner

FIG. 4

| Pixel coordinate (0, 0)-(7, 0) 8 horizontal × 1 vertical pixels pixel (Column 0) | (8, 0)-(15, 0) (Column 1) | · · · · · | (120, 0)-(127, 0) (Column 15) |
|---|---|---|---|
| (0, 1)-(7, 1) (Column 16) | (8, 1)-(15, 1) (Column 17) | | (120, 1)-(127, 1) (Column 31) |
| ⋮ | | | |
| (0, 31)-(7, 31) (Column 496) | | | (120, 31)-(127, 31) (Column 511) |

DATA PROCESSING APPARATUS, DATA PROCESSING METHOD AND DATA SHARING SYSTEM

TECHNICAL FIELD

The present invention relates to a data processing apparatus for processing data such as video and still images, and in particular to improvement of memory access efficiency.

BACKGROUND OF THE INVENTION

1. Background Art

In recent years, due to greatly expanded memory capacity and improved performance of processors, resolution of images handled in image processing has been increasing. For example, many application software products handle high definition (HD) video with 1920 horizontal pixels by 1080 vertical pixels. In the future, video with approximately 4000 horizontal pixels by 2000 vertical pixels, or so-called 4K2K video, and video with more pixels will be handled.

Since the processing load of such high-resolution images is heavy, various approaches have been utilized and developed to improve image processing performance. For example, there has been proposed an approach in which a multi-processor system causes each processor to perform processing in parallel. Some approaches are giving attention to improvement of memory access efficiency.

For example, conventionally, there has been known a technology for realizing improvement of memory usage efficiency in a multi-processor system. According to this technology, each processor selects necessary data from among data shared with other processors, duplicates the selected data, and stores it in its own dedicated memory (for example, Patent Literature 1).

Generally, image processing application software stores image data in a synchronous DRAM (SDRAM), and displays images by sequentially reading pieces of the image data that constitute the images, for example.

Here, banks constituting an SDRAM can be accessed by specifying respective row addresses and column addresses therein. By specifying the same row address in the same bank, burst transmission allows for continuous access to pieces of data stored in memory areas specified by column addresses. However, when it is necessary to consecutively access different row addresses in the same bank, there is an interval restriction. According to this restriction, a command needed for each access, i.e., "precharge command" and "activate command", can be issued only after a certain time period. As a result, memory access efficiency is reduced.

Since the technology described in Patent Literature 1 simply duplicates data and stores the data in a plurality of SDRAMs, the above technology cannot prevent the above-described reduction in memory access efficiency caused by consecutive access to the individual SDRAMs.

As a technology for preventing reduction of memory access efficiency, there has been known a technology for mapping a frame buffer area, which is composed of a plurality of two-dimensional image blocks, to a plurality of SDRAMs, and in particular, for mapping different SDRAMs to adjacent image blocks (for example, see Patent Literature 2).

CITATION LIST

Patent Literature

[Patent Literature 1]
WO 2009/116279
[Patent Literature 2]
Japanese Patent Application Publication No. 2005-196485

SUMMARY OF INVENTION

However, for example, in so-called motion estimation (motion compensation) performed in MPEG encoding according to H.264/MPEG AVC for image processing, for each macroblock or sub-macroblock, partial images corresponding to given positions defined in a frame image need to be consecutively read and processed. Consecutive access to the partial images corresponding to the given positions is not necessarily performed on adjacent image blocks, but might be performed on memory areas specified by different row addresses in the same bank. Accordingly, the above technology described in Patent Literature 2 cannot address such a case. This might reduce memory access efficiency. Such a problem, namely a problem caused by consecutive access to memory areas specified by different row addresses in the same bank in a memory, is not only related to image data processing.

In view of the above problem, the present invention has been achieved, and an aim thereof is to provide a data processing apparatus and a related technology for realizing efficient memory access by reducing frequency in which consecutive access is performed on memory areas specified by different row addresses in the same bank defined in a memory during procedures for processing of data such as images and character. To be specific, the procedures includes, for example, consecutive access to partial images corresponding to given positions defined in images, or consecutive access to characters corresponding to given positions defined in character sequences.

In order to solve the above problem, a data processing apparatus pertaining to the present invention is a data processing apparatus for accessing data to be processed, the data being stored in a memory composed of a plurality of blocks in each of which continuous access is possible, the data processing apparatus comprising: a mapping unit configured to determine addresses according to a first arrangement and addresses according to a second arrangement, the addresses being for mapping the data to a plurality of areas defined in the memory according to the determined addresses; a selection unit configured to select one of the arrangements that is more efficient in accessing a portion to be read of the data, based on an address range corresponding to the portion of the data, the address range differing depending on which of the arrangements is selected; and an access control unit configured to perform control such that access to the portion of the data is realized by accessing, from among the plurality of areas in the memory, an area corresponding to the addresses determined according to the selected arrangement, the memory storing data that is same as the data to be processed in two different areas, one corresponding to the addresses determined according to the first arrangement, the other corresponding to the addresses determined according to the second arrangement, wherein the addresses determined according to the first arrangement and the addresses determined according to the second arrangement are different from each other in terms of relative positions with respect to boundary addresses of the blocks in an address space.

With the above structure, the data processing apparatus pertaining to the present invention can achieve improvement of memory access efficiency as a whole. This is achieved by mapping the same data to two memory areas according to two arrangements, selecting one of the two memory areas that is more efficiently accessed each time a portion of the data is read, and accessing the selected memory area.

BRIEF DESCRIPTION OF DRAWINGS

FIG. 4 shows the structure of image blocks.

FIG. 9 is a time chart showing control signals transmitted to the memory 2000 or the like.

DETAILED DESCRIPTION OF INVENTION

<Embodiment>

Figure 1:
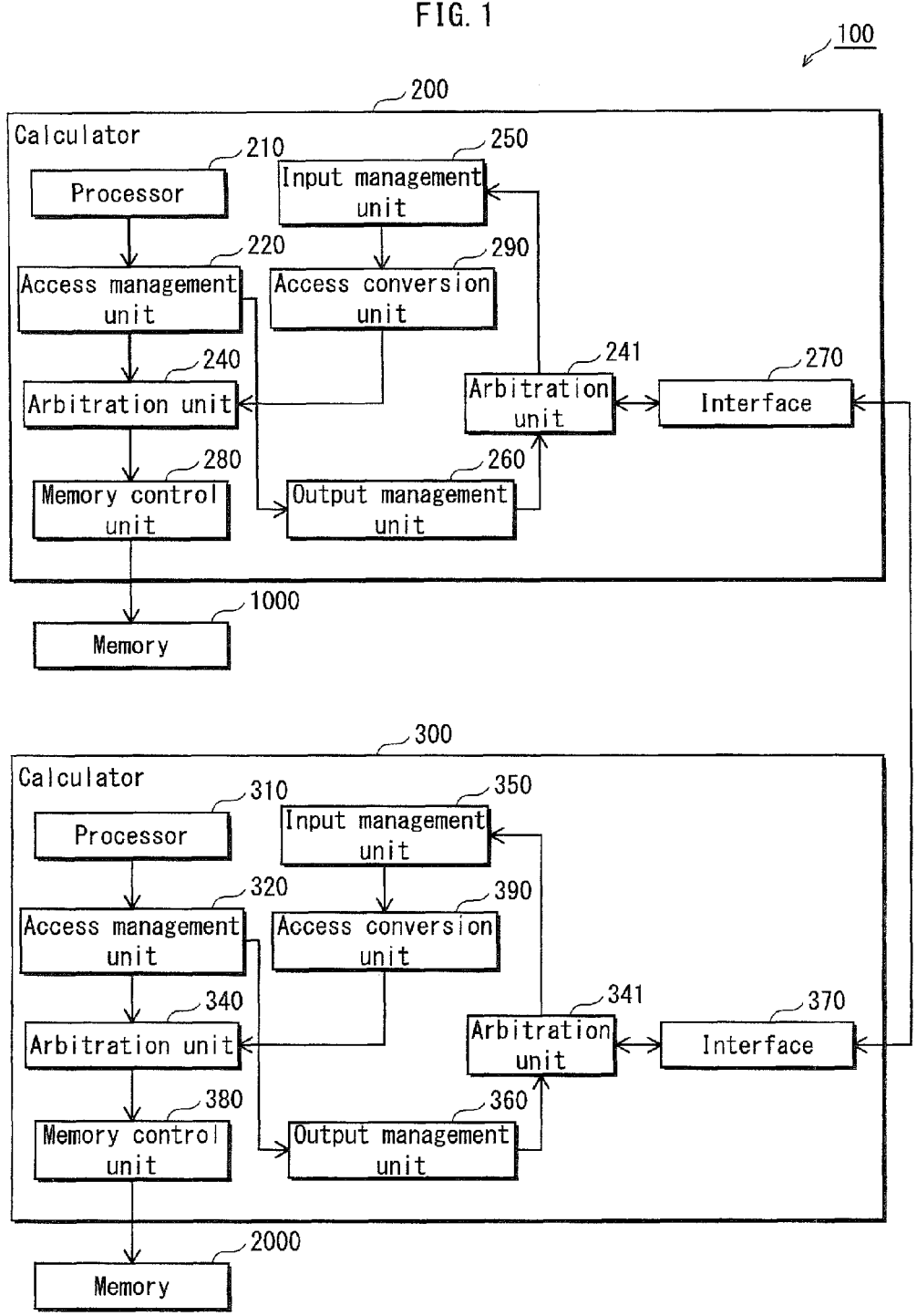
FIG. 1 is a functional block diagram of a data sharing apparatus 100 pertaining to an embodiment of the present invention.

The following describes a data sharing apparatus 100 pertaining to an embodiment of the present invention.

<Overview>

The data sharing apparatus 100 includes multiple processors (in this case, two processors), and used for MPEG encoding according to H.264/MPEG AVC.

During MPEG encoding, frame images of high definition (HD) video acquired by imaging, i.e., two-dimensional images with 1920 horizontal pixels by 1080 vertical pixels, are consecutively stored in a memory. So-called motion estimation (motion compensation) is performed for each partial image (e.g., macroblock, sub macroblock) included in a frame image to be processed. During motion estimation, for each partial image included in the frame image to be processed, a corresponding partial image is read from a reference frame image in order to estimate similarity between the frame image and the reference image.

The data sharing apparatus 100 performs address mapping such that a frame image is mapped to two memory areas. The two areas are different from each other in relationship with address boundaries of image blocks (described later in detail) defined in address spaces each corresponding to a different one of the memories in each of which continuous access is possible. Each time it is necessary to read a partial image corresponding to a frame image at a given position, depending on the position of the partial image, the data sharing apparatus 100 selects and accesses one of the two memory areas that is more efficiently accessed based on two address ranges that have been subject to address mapping.

<Memory Access Control>

First, the following briefly describes memory access control, which is a characteristic feature of the data sharing apparatus 100.

A memory 1000 and a memory 2000 that are included in the data sharing apparatus 100 (see FIG. 1) are synchronous DRAMs (SDRAMs) connected to two processors 210 and 310, respectively. Each of the memories 1000 and 2000 is composed of two SDRAMs (memory 0 and memory 1). These SDRAMs are each composed of four banks. A memory and a bank can be specified with use of a chip select signal and a bank address, respectively. By specifying a row address and a column address, it is possible to perform access in each bank. Burst transmission allows for, by specifying the same row address, continuous access to a plurality of pieces of 8 byte data specified by 512 column addresses. However, when access to different row addresses occurs, a precharge command and an activate command can be issued only after a certain time period. Accordingly, frequent access to different row addresses in the same bank reduces memory access efficiency.

The data sharing apparatus 100 stores data that is the same as a frame image in two memory areas by using two data arrangements for address mapping performed when storing an HD video frame image in memories.

The two arrangements each two-dimensionally map, in the two-dimensional address space (XY two-dimensional address space) defined by addresses in the X direction (X addresses) and addresses in the Y direction (Y addresses), image blocks corresponding to blocks each specified by the same row address in the same bank of a memory. When performing address mapping for storing two-dimensional images (pixel data constituting image data) in the memory, the X addresses and the Y addresses of the images are determined based on two-dimensional coordinates (x-coordinate in the horizontal direction and y-coordinate in the vertical direction) of each pixel of the two-dimensional images. The two arrangements are different with each other in term of relative positional relationship with between addresses of the two-dimensional images and the boundary addresses of the image blocks in the two-dimensional address space.

According to the present embodiment, to be specific, in the logical XY two-dimensional address space, addresses in the X direction are specified in units of columns, each of which is equivalent to 8 bytes, and addresses in the Y direction are specified in units of lines which indicate how many column sets of the X direction there are in the Y direction. The boundary address of each two-dimensionally mapped image block in the X direction is expressed as 16×N (where N is an integer equal to or greater than 0), and the boundary address of each image block in the Y direction is expressed as 32×M (where M is an integer equal to or greater than 0). Further, it is assumed that one column corresponds to image data with eight horizontal pixels by one vertical pixel. Each image block corresponds to one block that is composed of memory cells in an SDRAM as a physical address and specified by the same row address in the same bank. When an address of data to be accessed is determined in the logical XY two-dimensional address space, a physical address (memory, bank, row address, column address) is determined for practically accessing data included in the SDRAM. Note that adjacent image blocks defined in the XY two-dimensional address space correspond to different banks.

Further, assuming that a Y address of pixel data subject to address mapping in accordance with the first arrangement is Y0, a Y address of the same pixel data subject to address mapping in accordance with the second arrangement is Y0+16. Since a plurality of pieces of pixel data subject to address mapping within one image block correspond to the same row address in the same bank, continuous access to the plurality of pieces of pixel data is possible.

When consecutively reading partial images corresponding to a plurality of positions defined in a frame image in motion estimation and the like, the data sharing apparatus 100 selects, for each partial image, one of the two memory areas subject to address mapping according to the two arrangements. The selection is based on a judgment for judging which of the memory areas provides better memory access efficiency, and in accordance with the result of selection, the selected area is accessed. According to such a judgment, one of the two different address ranges to which a partial image is mapped including less image blocks is more efficiently accessed.

Accordingly, the data sharing apparatus 100 including processors each performing MPEG encoding in parallel improves access performance by reducing the number of access to image blocks when reading a partial image at a given position in a frame image. In addition, as a whole, a waste of memory bandwidth can be prevented by reducing frequency of consecutive access to different row addresses in the same bank, and therefore efficiency is improved.

<Structure>

The following describes the data sharing apparatus 100 pertaining to the present embodiment, and in particular the structure pertaining to access to image data in detail.

As shown in FIG. 1, the data sharing apparatus 100 is composed of a calculator 200 and a calculator 300. The calculator 200 and the calculator 300 are connected to each other via an interface 270 and an interface 370. The calculator 200 is connected to a memory 1000 that is composed SDRAM chips, and the calculator 300 is connected to a memory 2000 that is composed of SDRAM chips.

The following describes the structure of the calculator 200.

As shown in FIG. 1, the calculator 200 is composed of the processor 210 and other various circuits. The various circuits are functionally divided into an access management unit 220, an arbitration unit 240, an arbitration unit 241, an input management unit 250, an output management unit 260, an interface 270, a memory control unit 280 and an access conversion unit 290.

The processor 210 executes a program stored in a memory so as to control various steps of MPEG encoding, for example. In these steps, in order to write or read image data, the processor 210 issues an access request to the memory 1000 or the memory 2000, and accesses the memory. That is, the processor 210 outputs an access request such as a write request and a read request. The write request is for writing data pertaining to each frame image. The read request is for reading data pertaining to a partial image used for motion estimation for searching a partial image corresponding to each macroblock. After outputting the read request, the processor 210 reads data from the memory judged to be more efficiently accessed. Here, an access request (either a write request or a read request) includes an attribute for identifying a write request or a read request. Also, an access request includes the address (x coordinate, y coordinate) of top-left corner of image data to be accessed, and the size (width in the x direction and width in the y direction) of the image data.

Figure 2:
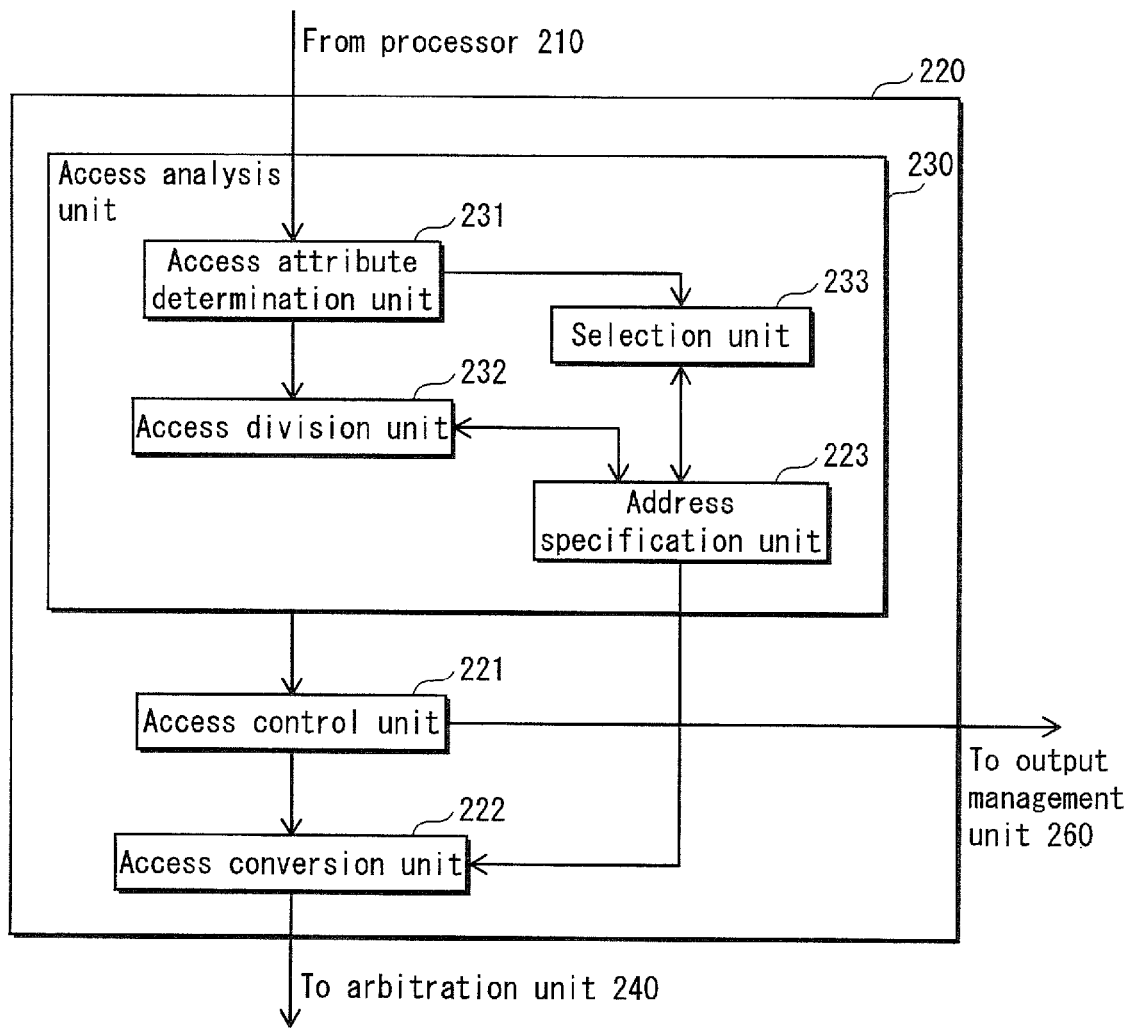
FIG. 2 is a functional block diagram of an access management unit.

The access management unit 220 manages an access request from the processor 210. That is, the access management unit 220 analyzes the access request so as to determine a destination, and transmits the access request to the destination. As shown in FIG. 2, the access management unit 220 includes an access analysis unit 230, an access control unit 221, an access conversion unit 222 and an address specification unit 223.

The address specification unit 223 specifies, based on an image address (x coordinate, y coordinate) of two-dimensional image data, an address in the XY two-dimensional address space according to the first arrangement for the memory 1000. At the same time, the address specification unit 223 specifies, based on the image address, an address in the XY two-dimensional address space according to the second arrangement for the memory 2000. According to the first arrangement, the position of top-left corner of image frame corresponds to a value of X address 16×N (where N is an integer equal to or greater than 0, e.g., 0) and a value of Y address 32×M (where M is an integer equal to or greater than 0, e.g., 0) in the XY two-dimensional address space. According to the second arrangement, the position of top-left corner of image frame corresponds to a value of X address 16×N, and a value of Y address 32×M+16 in the XY two-dimensional address space.

The access conversion unit 222 converts an address in the XY two-dimensional address space to a physical address in the memory 1000. Note that address mapping performed by the access conversion unit 222 and the address specification unit 223 will be described later in detail.

The access analysis unit 230 analyzes an access request from the processor 210, and includes an access attribute determination unit 231, an access division unit 232 and a selection unit 233. An access request input to the access analysis unit 230 includes addresses (x coordinates, y coordinates) of top-left corner and down-right corner of a rectangular image defined in the two-dimensional image data. An access request output from the access analysis unit 230 includes an address in the logical XY two-dimensional address space. The logical XY two-dimensional address space is formed by two-dimensionally mapping image blocks corresponding to memory cells having the same row address in the same bank. Here, in the XY two-dimensional image data in which a position of each pixel is specified by x coordinate and y coordinate, a direction in which x coordinate increases is assumed a right direction, and a direction in which y coordinate increases is assumed a downward direction. Accordingly, the top-left corner of the rectangular image is specified by the smallest x coordinate and y coordinate in the coordinates of pixels constituting the rectangular image.

The access attribute determination unit 231 determines whether an access request is a write request or a read request.

The access division unit 232 divides an access request into two access requests, and outputs one access request (write request) to the memory 1000 and the other access request (write request) to the memory 2000 to write the same data in the memory 1000 and the memory 2000.

The selection unit 233 judges which one of the memory 1000 and the memory 2000 is more efficiently accessed when reading partial image data targeted for a read request, and selects one of the memory 1000 and the memory 2000 that is more efficiently accessed. In this judgment, the address specification unit 223 obtains an address range corresponding to the partial image according to the first arrangement and an address range corresponding to the partial image according to the second arrangement. Subsequently, the address specification unit 223 calculates the number of image block boundaries each address range occupies in the XY two-dimensional address space. In other words, the address specification unit 223 calculates the number of image blocks each address range includes. Then the address specification unit 223 selects the memory corresponding to the arrangement with less image blocks as a memory to be more efficiently accessed.

The access control unit 221 selects a memory to be accessed based on the analysis result of the access analysis unit 230, and then performs control such that the selected memory is accessed. When the access request analyzed by the access analysis unit 230 is a write request, the two access requests divided by the access division unit 232 are transmitted to the access conversion unit 222 and the output management unit 260 so as to realize data writing into the memory 1000 and the memory 2000. Alternatively, when the access request is a read request, the access request is transmitted based on the selection result of the selection unit 233. That is, when data is read from the memory 1000, the access request is transmitted to the access conversion unit 222, and when data is read from the memory 2000, the access request is transmitted to the output management unit 260.

So as to write/read data in/from the memory 1000, the access conversion unit 222 generates physical addresses for accessing an SDRAM based on logical addresses in the XY two-dimensional address space. The physical addresses are generated based on conventional algorithm for associating adjacent image blocks to different banks (alternatively, different SDRAM chips may be used) (see Patent Literature 2).

The input management unit 250 manages an access request transmitted from the calculator 300 to the memory 1000. The input management unit 250 receives an access request transmitted via the interface 270, and transmits the received access request to the access conversion unit 290. Note that the access conversion unit 290 has the same function as that of the access conversion unit 222. The access conversion unit 290 generates physical addresses for accessing the memory 1000 based on the access request including the XY two-dimensional address transmitted from the calculator 300.

The output management unit 260 transmits the access request from the calculator 200 to the calculator 300 via the interface 270. The interface 270 performs interface adjustment between the two calculators.

The arbitration unit 240 performs arbitration so that access by the processor 210 and access by the calculator 300 do not coincide on the memory 1000. In addition, the arbitration unit 241 performs arbitration so that input of an access request from the calculator 300 and output of an access request to the calculator 300 do not coincide on the interface 270.

So as to write data in the memory 1000 or read data from the memory 1000 according to an access request, the memory control unit 280 controls the memory 1000 by determining reading or writing, or outputting a control signal (command and the like) in accordance with a physical address.

The calculator 300 includes a processor 310, an access management unit 320, an arbitration unit 340, an arbitration unit 341, an input management unit 350, an output management unit 360, an interface 370, a memory control unit 380 and an access conversion unit 390. Each of these components has the same functions as corresponding one of the above-described components of the calculator 200.

<Address Mapping>

Figure 3:
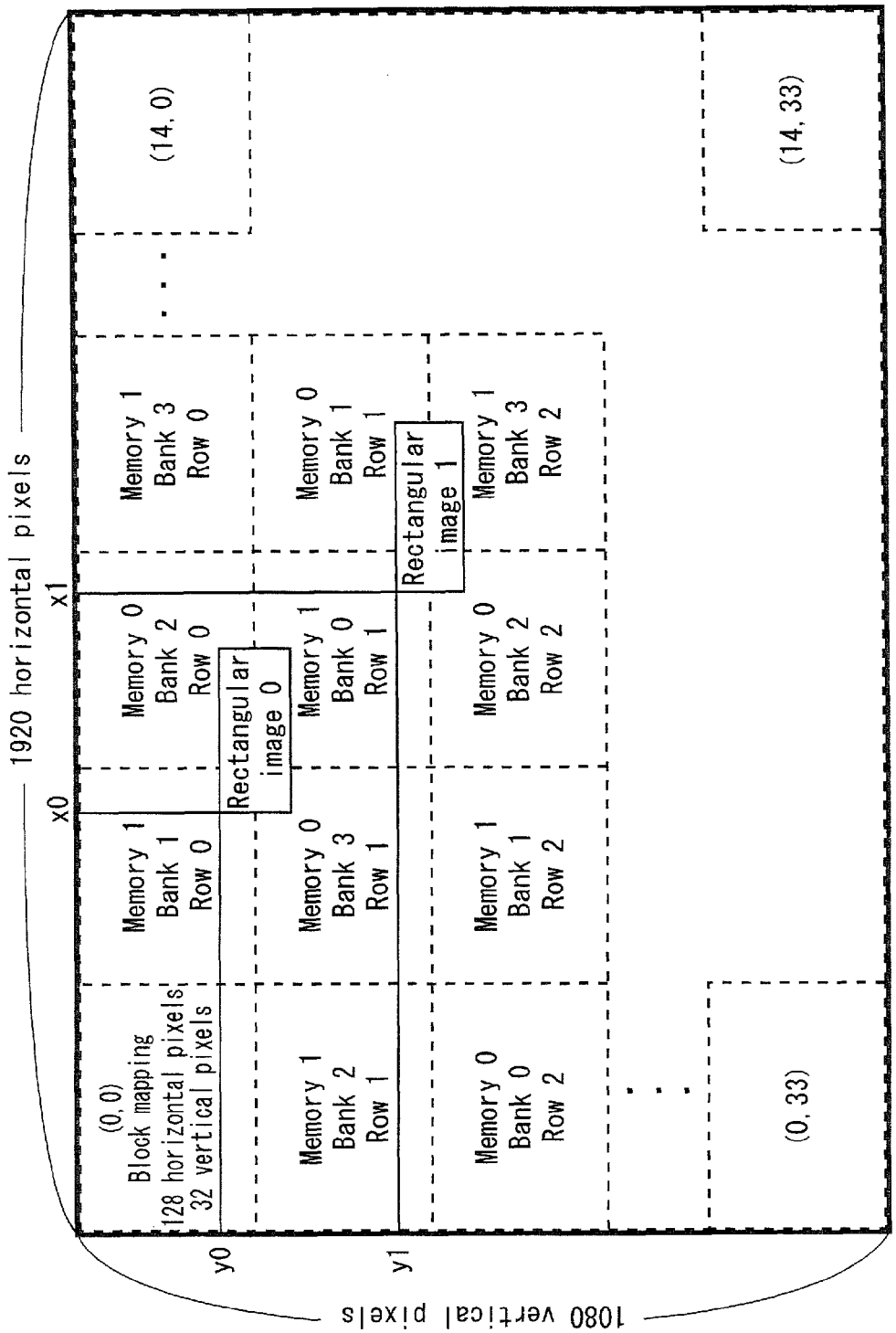
FIG. 3 shows address mapping in a memory 1000 according to the first arrangement.

FIG. 3 shows an association between an HD frame image and the XY two-dimensional address space according to the first arrangement for the memory 1000, and an association between the XY two-dimensional address space and address specification in the SDRAM.

In the XY two-dimensional address space, image blocks are mapped in a two-dimensional matrix. The image blocks correspond to blocks (memory cells) each specified by the same row address in the same bank in the same SDRAM. In FIG. 3, boundaries of the image blocks are indicated by dashed lines. FIG. 3 only shows an area in which one frame image is mapped. Here, the top-left corner of an HD frame image with 1920 horizontal pixels by 1080 vertical pixels corresponds to a position whose X address is 0 and Y address is 0 in the XY two-dimensional address space. In this case, the frame image is mapped to 15 image blocks in the X direction, and 34 image blocks in the Y direction.

FIG. 4 shows a relationship between an image block and pixels with use of an example case of one image block positioned at the top-left corner among the image blocks indicated by dashed lines in FIG. 3.

As shown in FIG. 4, the width of the image block in the X direction is 16 (i.e., 128 bytes), and the width in the Y direction is 32. The image block indicates a range that can be accessed by the same row address. The range can be accessed by 512 column addresses. Eight bytes can be stored at one column address. With the data structure in which one pixel corresponds to one byte, one column corresponds to data with eight pixels. Data with 128 horizontal pixels by 32 vertical pixels can be mapped to one image block.

Figure 5:
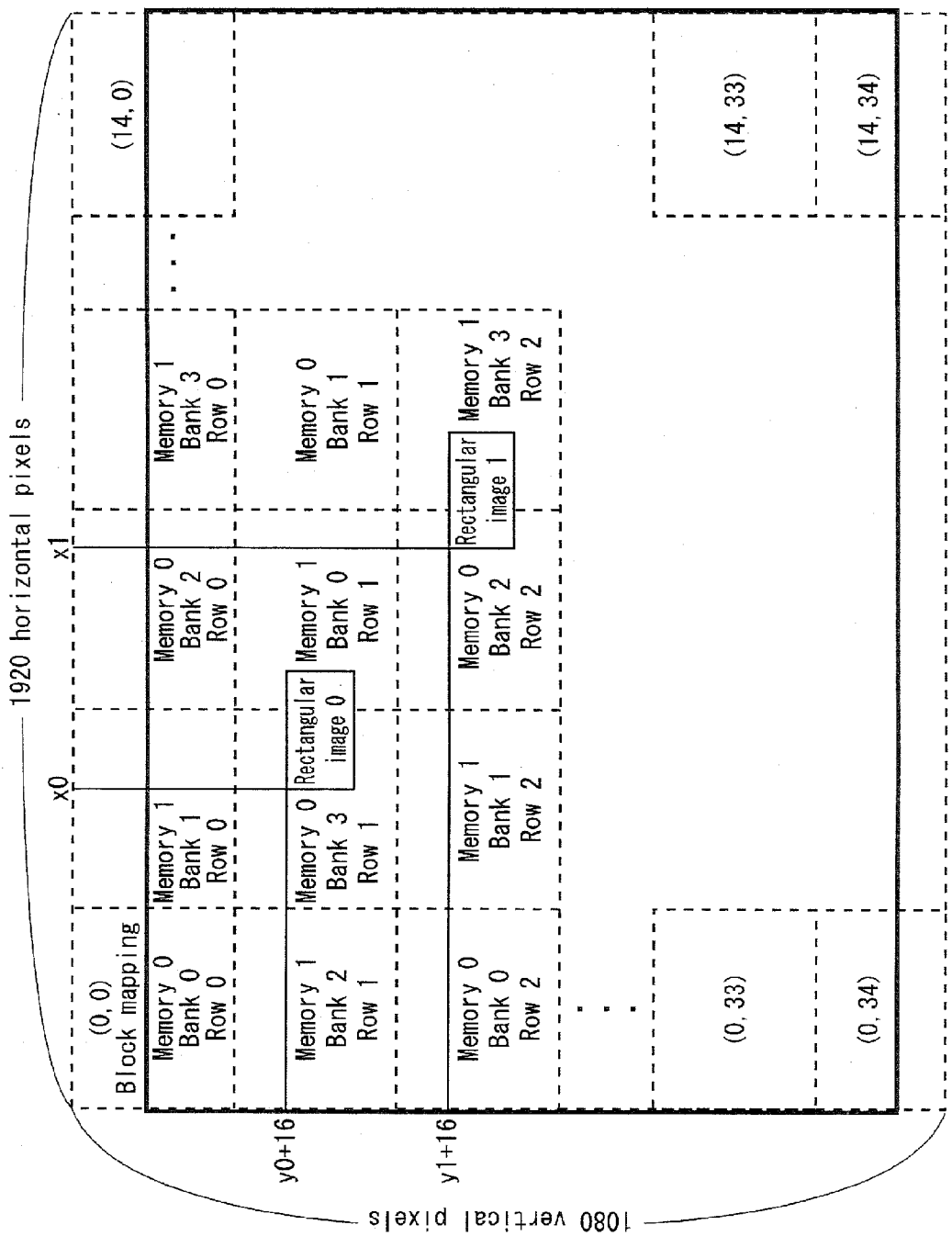
FIG. 5 shows address mapping in a memory 2000 according to the second arrangement.

FIG. 5 shows an association between an HD frame image and the XY two-dimensional address space according to the second arrangement for the memory 2000, and an association between the XY two-dimensional address space and address specification in the SDRAM. In FIG. 5, boundaries of the image blocks are also indicated by dashed lines. FIG. 5 only shows an area in which one frame image is mapped. Here, 16 lines offset is provided in the Y direction, and the top-left corner of an HD frame image with 1920 horizontal pixels by 1080 vertical pixels corresponds to a position whose X address is 0 and Y address is 16 in the XY two-dimensional address space.

As is clear from FIGS. 3 and 5, in the XY two-dimensional address space, the address range to which the frame image is mapped according to the first arrangement is offset by 16, i.e., a half of an image block in the Y direction from the address range to which the frame image is mapped according to the second arrangement.

Suppose that, with regard to data of a certain pixel in the frame image, X address and Y address according to the first arrangement are determined as X1 and Y1, respectively, and X address and Y address according to the second arrangement are determined as X2 and Y2, respectively. In this case, relationships among them are expressed by the following equations.

$$X2=X1 \qquad \text{(Equation 1)}$$

$$Y2=Y1+16 \qquad \text{(Equation 2)}$$

Note that in the case where a two-dimensional coordinate of pixel data is specified as (x0, y0), values of X and Y addresses, i.e., X1 and Y1 that are determined according to the first arrangement are expressed by the following equations.

$$X1=int(x0/8) \qquad \text{(Equation 3)}$$

$$Y1=y0 \qquad \text{(Equation 4)}$$

Here, int in the equation indicates that the fractional portion is rounded to the whole number.

FIGS. 3 and 5 show that rectangular images 0 and 1 correspond to different addresses between the first arrangement and the second arrangement. The rectangular images 0 and 1 are examples of rectangular images that are consecutively accessed as targets for motion estimation.

FIGS. 3 and 5 also show which image blocks in the two-dimensional address space are associated with blocks in the memories by the access conversion unit. "Memory 0" and "memory 1" in FIGS. 3 and 5 are different SDRAM chips, which constitute each of the memory 1000 and the memory 2000.

<Operation>

The following describes operations of the data sharing apparatus 100 with the above structure.

Figure 6:
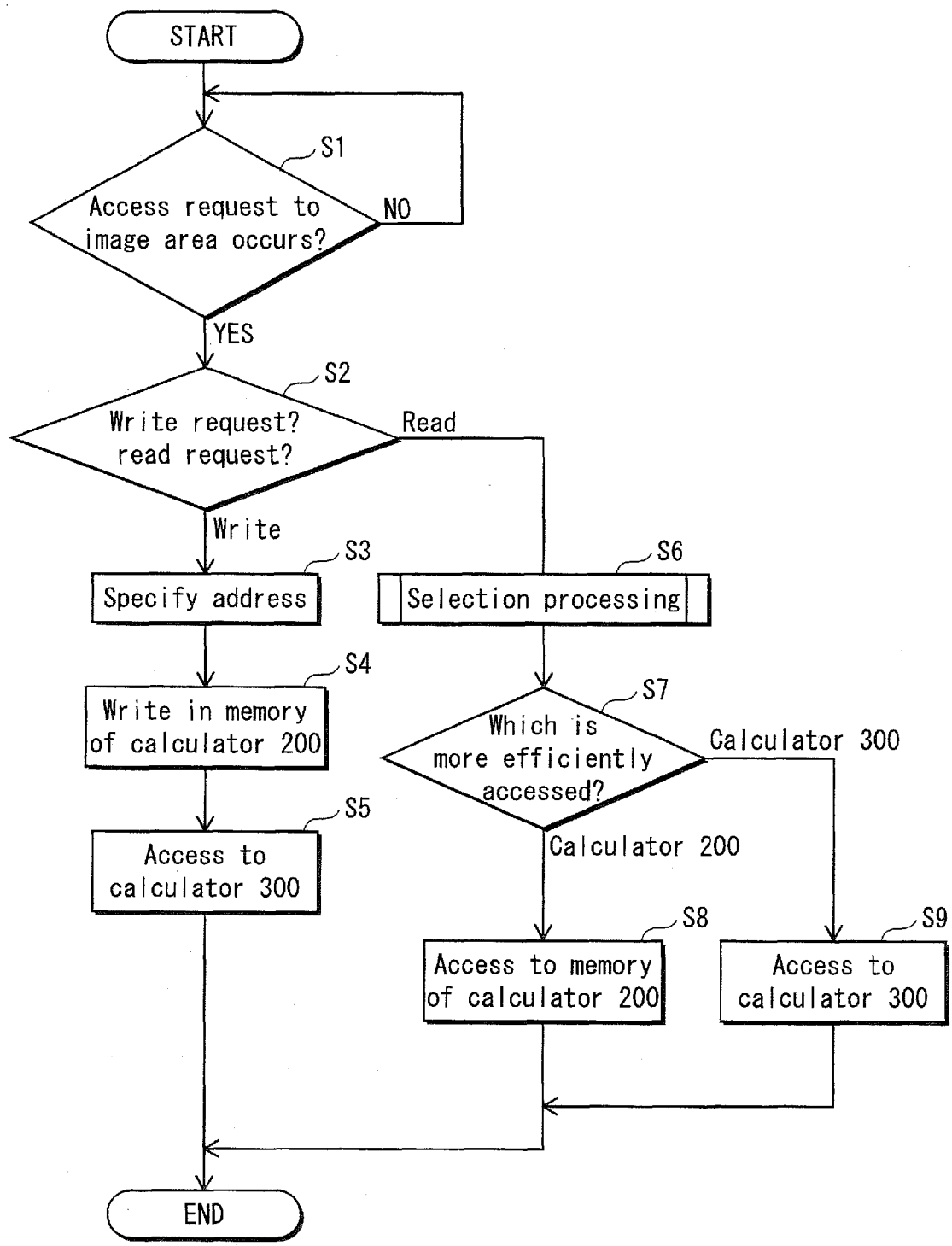
FIG. 6 is a flowchart showing an operation of a calculator of the data sharing apparatus 100.

FIG. 6 is a flowchart showing operations pertaining to access to image data performed by the processor 210 of the calculator 200.

As shown in FIG. 6, when receiving an access request from the processor 210 of the calculator 200, the access attribute determination unit 231 determines whether the access request is a write request or a read request based on an attribute of the access request (steps S1 and S2).

In the case where the access request is a write request, processing is as follows: the address specification unit 223 specifies, for each of the first arrangement and the second arrangement, an address range in the XY two-dimensional address space, based on the address (x coordinate, y coordinate) of top-left corner and the size (widths in the x direction and y direction) of image data to be accessed pertaining to the access request; based on the result of specification, the access division unit 232 generates an access request addressed to the memory 1000 with the address range determined according to the first arrangement and an access request addressed to the memory 2000 (calculator 300) with the address range determined according to the second arrangement, and transmits these generated access requests to the access control unit 221 (step S3); the access control unit 221 transmits the access request to the access conversion unit 222, and the access conversion unit 222 converts addresses to physical addresses for accessing the memory 1000 based on the address range in the XY two-dimensional address space pertaining to the access request; the access conversion unit 222 controls writing of data into the memory 1000 via the arbitration unit 240 and the memory control unit 280 (step S4).

Also the access control unit 221 transmits, to the output management unit 260, the access request to the memory 2000. The output management unit 260 transmits the access request (write request) to the calculator 300 via the arbitration unit 241 and the interface 270 (step S5).

Figure 7:
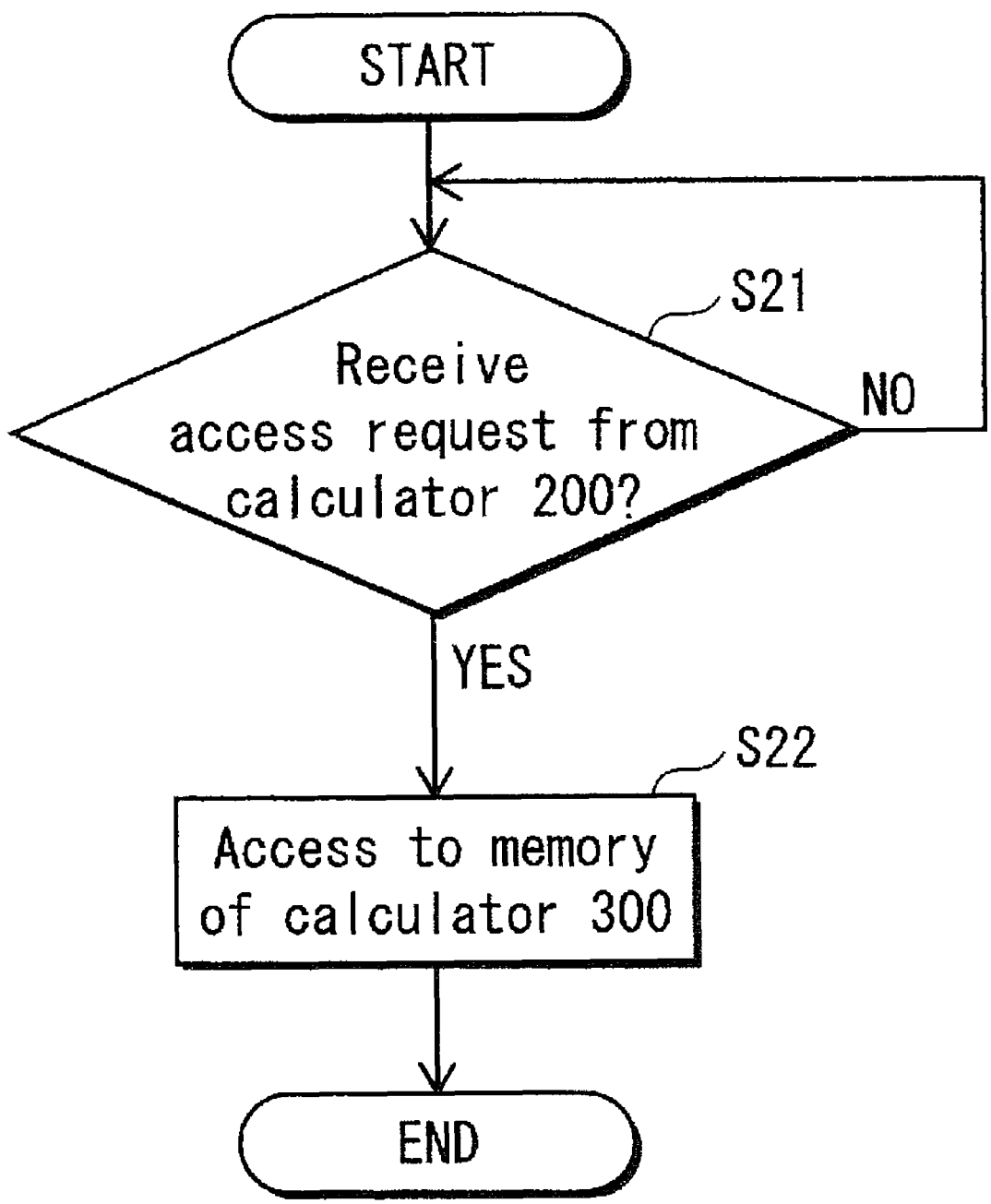
FIG. 7 is a flowchart showing an operation of the calculator obtaining an access request from another calculator.

Here, FIG. 7 shows the operations of the calculator 300 that has received the access request from the calculator 200 in step S5.

The input management unit 350 of the calculator 300 receives the access request transmitted via the interface 370 and the arbitration unit 341 (step S21). The input management unit 350 transmits, to the access conversion unit 390, the address range that is included in the access request and has been determined according to the second arrangement in the XY two-dimensional address space. The access conversion unit 390 converts addresses in the XY two-dimensional address space to physical addresses for accessing the memory 2000. Subsequently, via the arbitration unit 340 and the memory control unit 380, data is written in the memory 2000 or data is read from the memory 2000 in accordance with the attribute of the access request, i.e., whether the request is the write request or the read request (step S22).

In addition, in the case where the access attribute determination unit 231 determines that the access request is a read request in step S2 of FIG. 6, the selection unit 233 judges which one of the memory 1000 and the memory 2000 is more efficient in reading data to be accessed, and selects one of the memory 1000 and the memory 2000 judged to be more efficient (step S6). Such selection processing will be described later in detail.

In step S6, when the selection unit 233 determines that the memory 1000 connected to the calculator 200 is more efficiently accessed, that is, the data mapped according to the first arrangement is selected (step S7), the access analysis unit 230 transmits, to the access control unit 221, the access request addressed to the memory 1000 including the address range determined according to the first arrangement. The access control unit 221 transmits the access request addressed the memory 1000 to the access conversion unit 222. The access conversion unit 222 converts addresses to the physical addresses for accessing the memory 1000 based on the address range pertaining to the access request in the XY two-dimensional address space. Subsequently, data is read from the memory 1000 via the arbitration unit 240 and the memory control unit 280 (step S8). In addition, in step S6, when the selection unit 233 determines that the memory 2000 connected to the calculator 300 is more efficiently accessed, that is, the data mapped according to the second arrangement is selected (step S7), the access analysis unit 230 transmits, to the access control unit 221, the access request addressed to the memory 2000 (calculator 300) including the address range determined according to the second arrangement. The access control unit 221 transmits the access request addressed to the memory 2000 to the output management unit 260. The output management unit 260 transmits the access request (read request) to the calculator 300 via the arbitration unit 241 and the interface 270 (step S9).

Figure 8:
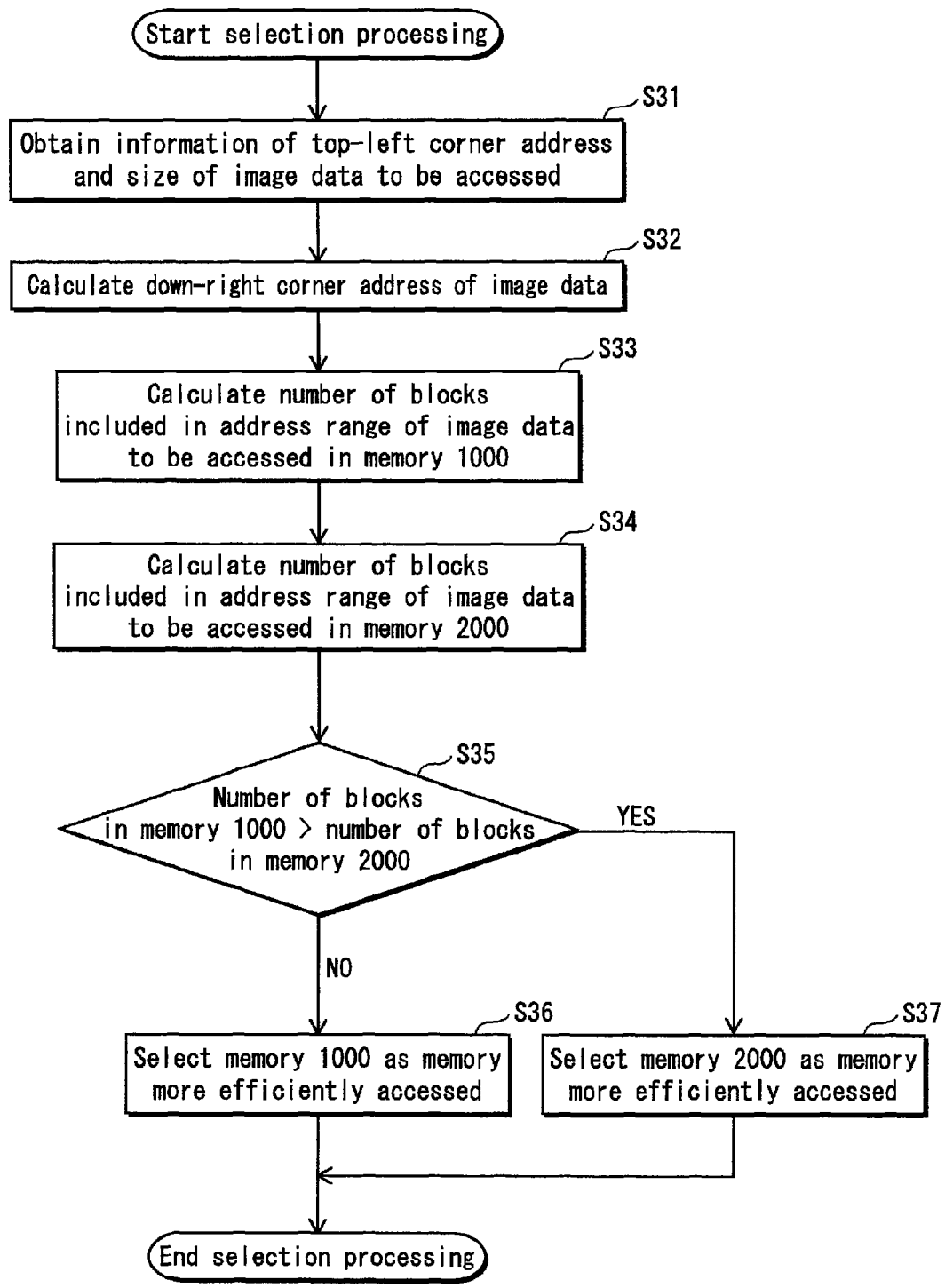
FIG. 8 is a flowchart showing selecting processing.

The following describes the selection processing in detail, with reference to FIG. 8.

The selection unit 233 obtains the address (x coordinate, y coordinate) of top-left corner and the size of the image data to be accessed (hereinafter, referred to as "partial image") (step S31). The address and the size are included in the access request. The selection unit 233 then calculates the down-right corner address of the image based on the obtained address of top-left corner and size (step S32), and calculates a range of X addresses and Y addresses of the partial image according to the first arrangement in the XY two-dimensional address space. Subsequently, the selection unit calculates the number of image blocks included in the calculated address range (step S33).

Suppose that, according to the first arrangement corresponding to the memory 1000, the X address of top-left corner of the partial image is Xa, the Y address of top-left corner is Ya, the X address of the right-down corner is Xb, and the Y address of the right-down corner is Yb in the XY two-dimensional address space. It is then possible to determine, from the following equations 5-9, image blocks to which the top-left corner of the partial image belongs (BXa, BYa), image blocks to which the right-down corner belongs (BXb, BYb), and the number of image blocks Bn the partial image includes.

$$BXa = int(Xa/16) \quad \text{(Equation 5)}$$

$$BYa = int(Ya/32) \quad \text{(Equation 6)}$$

$$BXb = int(Xb/16) \quad \text{(Equation 7)}$$

$$BYb = int(Yb/32) \quad \text{(Equation 8)}$$

$$Bn = (BXb - BXa + 1) \times (BYb - BYa + 1) \quad \text{(Equation 9)}$$

Subsequently, for the partial image, the address range of the X addresses and Y addresses in the XY two-dimensional address space is calculated according to the second arrangement. Then the number of image blocks included in the address range is calculated (step S34). The calculated address range of the X addresses and Y addresses is different from that of the first arrangement due to the offset by 16 in the Y direction. Suppose that, based on the addresses calculated according to the second arrangement, the X address of top-left corner of the partial image is Xa, the Y address of top-left corner is Ya, the X address of the right-down corner is Xb, and the Y address of the right-down corner is Yb in the XY two-dimensional address space. It is then possible to specify, from the same equations 5-9, image blocks to which the top-left corner of the partial image belongs (BXa, BYa), image blocks to which the right-down corner belongs (BXb, BYb), and the number of image blocks Bn the partial image includes.

The selection unit 233 compares the numbers of image blocks calculated in steps S33 and S34. In the case where the number of image blocks pertaining to the first arrangement is greater (step S35: YES), the memory 2000 corresponding to the second arrangement is selected as a memory that is more efficiently accessed (step S37). In the case where the number of image blocks pertaining to the first arrangement is not greater (step S35: NO), the memory 1000 corresponding to the first arrangement is selected as a memory that is more efficiently accessed (step S36).

<Consideration on Memory Access Operations>

According to the data sharing apparatus 100, when the frame image is recorded as shown in FIGS. 3 and 5 and the calculator 200 or the calculator 300 reads the rectangular images 0 or 1, the rectangular images 0 or 1 is read from the memory 2000 storing the frame image mapped according to the second arrangement, as shown in FIG. 5. In the memory 2000, the number of image blocks included in the rectangular images is smaller.

Figure 9:
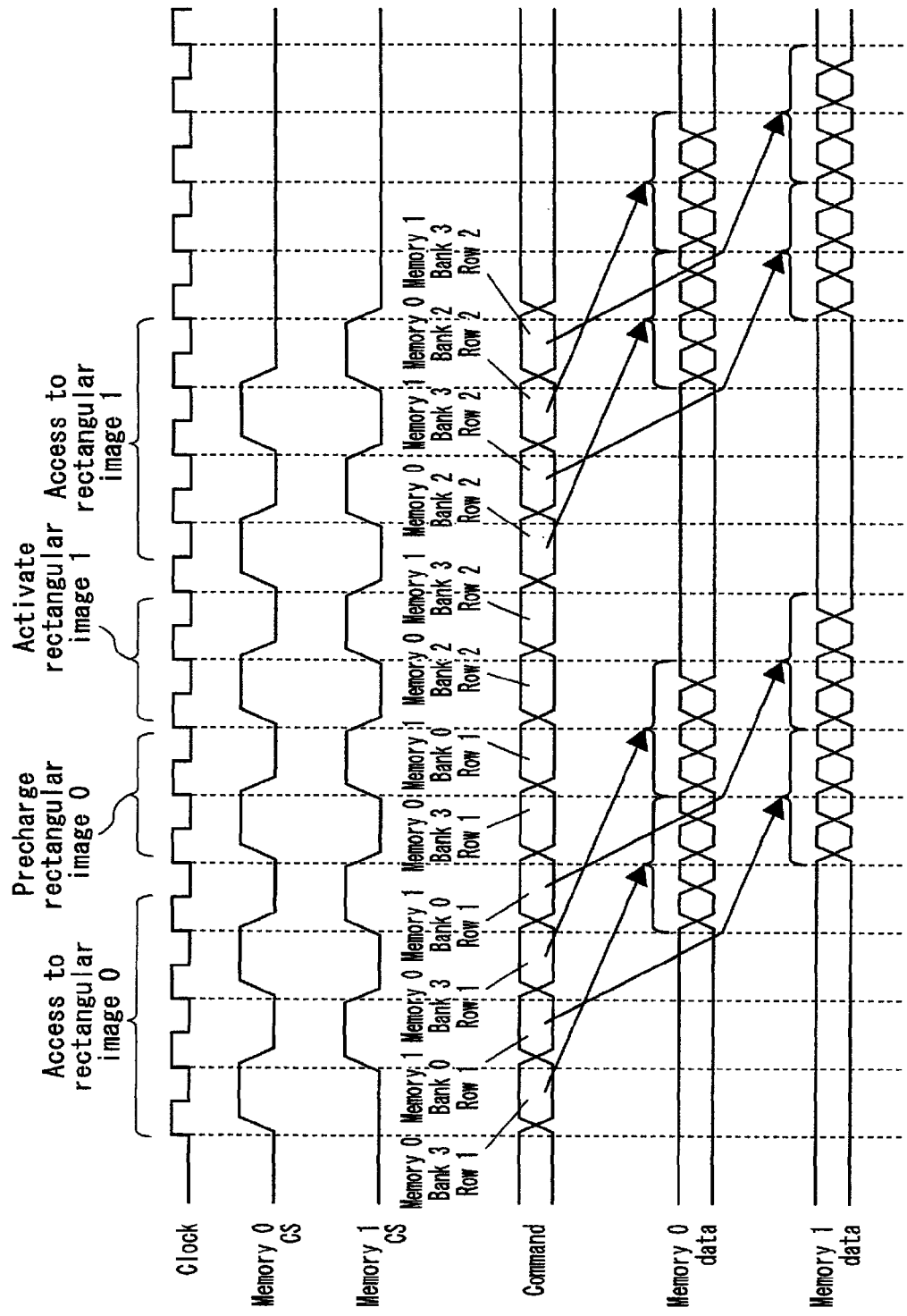

FIG. 9 is a time chart showing control signals transmitted to the memory 2000 from the memory control unit 380 of the calculator 300 and data signals output from the memory 2000 when the rectangular images 0 and 1 are mapped as shown in FIG. 5 in the XY two-dimensional address space determined according to the second arrangement corresponding to the memory 2000, and the rectangular image 0 and the rectangular image 1 are consecutively read.

The memory control unit 380 of the calculator 300 issues activate commands to two blocks (memory cells) included in the rectangular image 0, i.e., a block in memory 0, bank 3, row 1, and a block in memory 1, bank 0, row 1. Subsequently, read commands are issued to the two blocks, and image data is read. Note that FIG. 9 shows an example case in which one column corresponds to four bytes, two banks are accessed as one block, and twice data is read. After that, precharge commands are consecutively issued to two blocks included in the rectangular image 0, and then activate commands and read commands are issued to the two blocks included in the rectangular image 1, i.e., a block in memory 0, bank 2, row 2, and a block in memory 1, bank 3, row 2. The above-described processing realizes consecutive access to the rectangular images 0 and 1.

Figure 10:
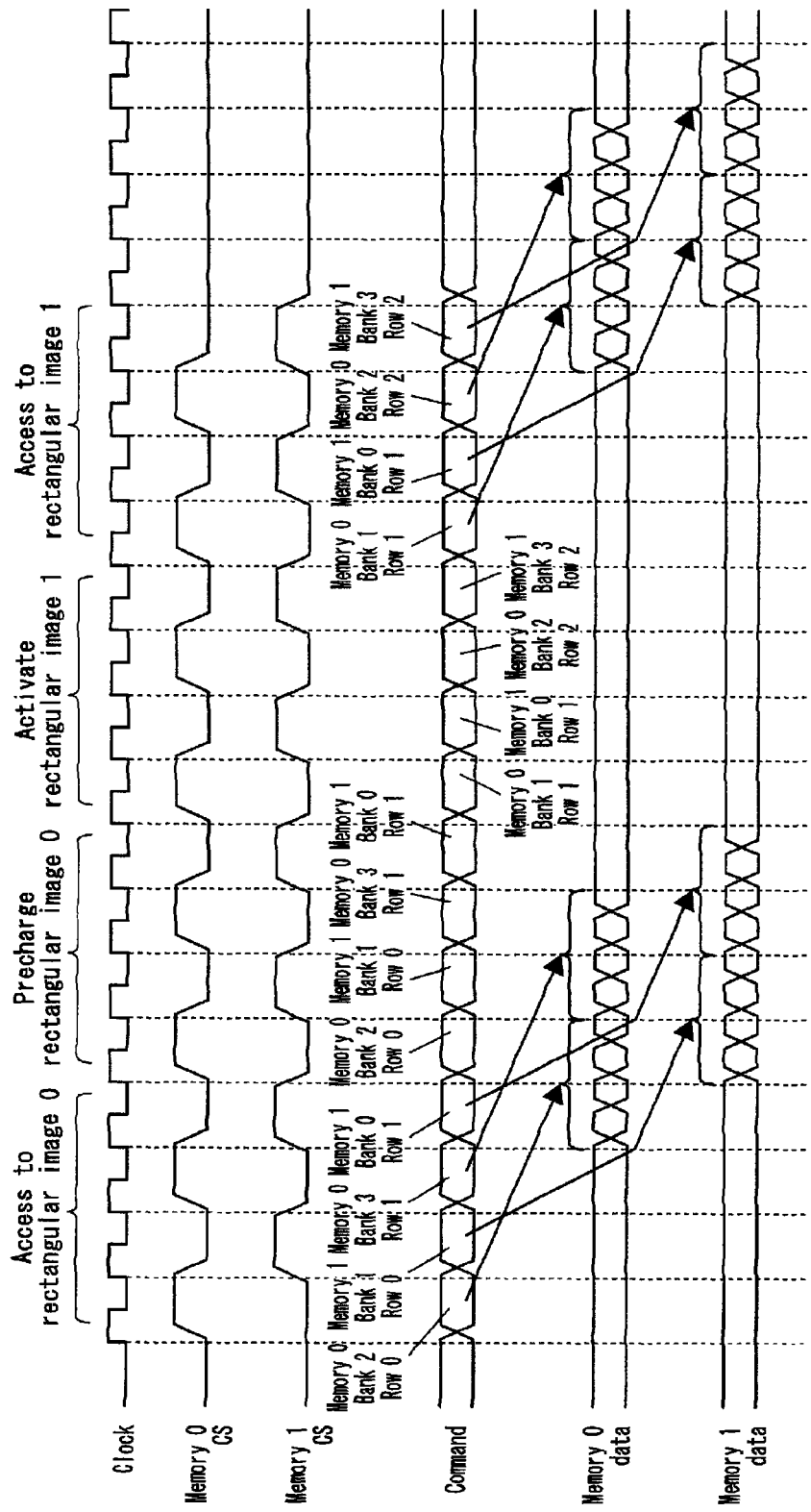
FIG. 10 is a time chart based on the assumption that the memory 1000 is accessed.

For comparison with the above example case, suppose an attempt to consecutively read the rectangular images 0 and 1 positioned as shown in FIG. 3 in the XY two-dimensional address space determined according to the first arrangement, i.e., an attempt to consecutively read the rectangular images 0 and 1 from the memory 1000. FIG. 10 is a time chart showing control signals output to the memory 1000 and data signals output from the memory 1000 in that case.

The memory control unit 280 in the calculator 200 issues activate commands to four blocks (memory cells) included in the rectangular image 0, i.e., a block in memory 0, bank 2, row 0, a block in memory 1, bank 1, row 0, a block in memory 0, bank 3, row 1, and a block in memory 1, bank 0, row 1. Subsequently, read commands are issued to the four blocks, and image data is read. After that, precharge commands are desired to be issued to the four blocks included in the rectangular image 0, and activate commands are desired to be issued to four blocks included in the rectangular image 1, i.e., a block in memory 0, bank 1, row 1, a block in memory 1, bank 0, row 1, a block in memory 0, bank 2, row 2, and a block in memory 1, bank 3, row 2. At this time, however, the rectangular image 0 includes a block in memory 0, bank 2, row 0, and the rectangular image 1 includes a block in memory 0, bank 2, row 2. This is access to image blocks specified by the different rows addresses in the same bank, and commands cannot be issued for a certain time period due to the characteristics of SDRAM (interval restriction). This requires the certain time period before precharge commands are issued to each block pertaining to the rectangular image 0 and activate commands and read commands are issued to each block included in the rectangular image 1. During the certain time period, even an access request from another processor cannot access any block in memory 0, bank 2. This reduces access efficiency.

The data sharing apparatus 100 issues control signals as shown in FIG. 9 other than as shown in FIG. 10, which is a supposed case. This prevents a waste of memory bandwidth, and improves access efficiency.

<Supplementary Explanation>

While an embodiment of the data sharing apparatus has been described as an example of a data processing apparatus pertaining to the present invention, the following modifications are possible. The data processing apparatus pertaining to the present invention is in no way limited to the data sharing apparatus described in the above embodiment.

Figure 11:
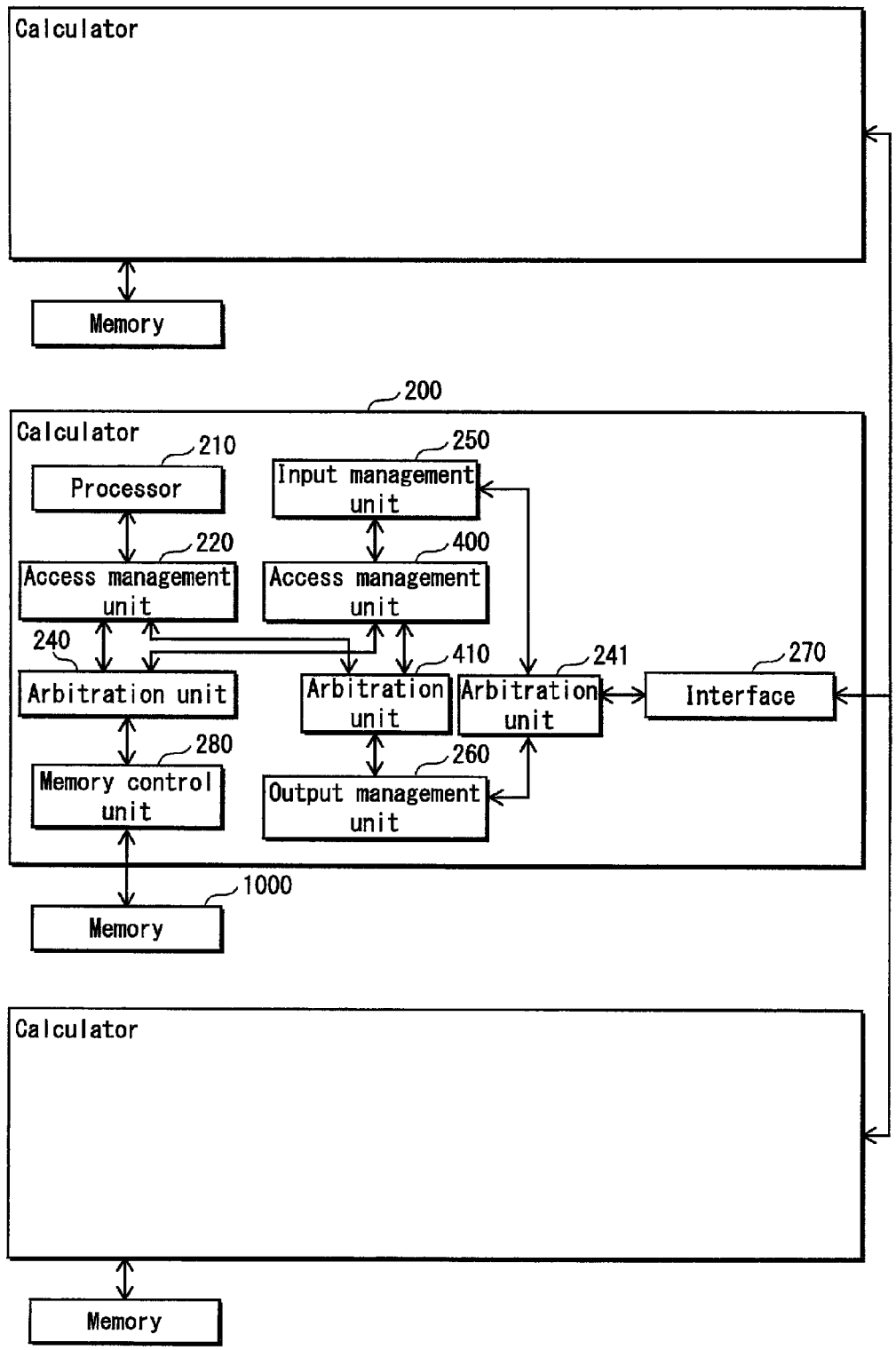
FIG. 11 is a functional block diagram of a data sharing apparatus including three calculators.

(1) In the above embodiment, the data sharing apparatus is composed of two calculators that share image data. However, more than three calculators may be provided and data other than image data, i.e., character data and the like, may be shared. For example, among three calculators A, B and C each including a dedicated memory and connected to one another via a bus, the calculator A and the calculator B may share data D, and the calculator A and the calculator C may share data E. In this case, when updating data shared with another calculator, each calculator may transmit an identifier and updated data of the shared data to another calculator via the bus. If a calculator acquires an identifier that has been transmitted via the bus and data of the identifier is shared with the calculator, the calculator may store updated data of the data in the dedicated memory thereof. FIG. 11 shows an example case in which the data sharing apparatus is composed of three calculators. In FIG. 11, an access management unit 400 has the same function as the above-described access management unit 220, and an arbitration unit 410 performs arbitration so that access requests output from the access management unit 220 and the access management unit 400 do not coincide. The access management unit 400 enables the calculator 200 to receive address specification of image, for example, from another calculator and realize access to image data in its memory. Further, each calculator may include a processing engine circuit such as a decoder specialized in certain processing such as image processing, and the access management unit may select the processing engine circuit as a destination of transmission of an access request other than the memory.

Each calculator may implement only an algorithm or a processor pertaining to one arrangement of data mapping in the dedicated memory thereof. Each calculator may receive a specification of data, a logical address or coordinates of the data from another calculator, and then, based on the specification, returns the number of blocks to be accessed according to a corresponding arrangement. Alternatively, each calculator may compare the number of blocks returned by the said another calculator and the number of blocks according to the corresponding arrangement, and then determine one of the dedicated memories of two calculators that is more efficiently accessed. Note that this requires arrangements determined by the calculators to be different from one another in offset from the block boundaries of the memories.

(2) In the above embodiment, the data processing apparatus composed of the two calculators each including a processor and connected to one memory as an example. The number or processors and memories, however, may not be limited in this way. Any data processing apparatus may include at least one processor and a plurality of memory areas, and determine a plurality of memory areas to map the same data according to a plurality of arrangements. These arrangements are different with one another in terms of relative positional relationships with respect to boundaries of memory blocks (memory cells corresponding to the same row address in the same bank). For example, one processor may map data such as a frame image to a memory area, and may map data that is the same data to another memory area after altering the positional relationship with respect to the block boundaries of the memory. The one processor may then read a portion to be read of the data from one of the memory areas that occupies less block boundaries.

(3) The numbers of memories, banks, columns and lines described in the above embodiment are examples, and may be different values. Further, in the above embodiment, each image block consists of 16 horizontal columns (128 bytes) and 32 vertical lines. These may be changed in accordance with the number of column addresses, the number of data signal wires and the like. In addition, in the above embodiment, one pixel data corresponds to one byte, but may not be limited in this way. Such one pixel data may correspond to each of a luma component (Y), or color difference components (Cb, Cr).

(4) In the above embodiment, data is mapped according to two different arrangements. The data is mapped in the two-dimensional address space without offset, and the same data is mapped in the two-dimensional address space with offset that is 16 in the Y direction. But data mapping is not limited in this way. When a plurality of portions defined in frame image data need to be efficiently accessed, two arrangements for mapping data should be determined as follows: when a portion of the frame image data is more efficiently accessed by accessing a memory area mapped according to one of the two arrangements, there must be at least one portion of the frame data that is more efficiently accessed by accessing a memory area mapped according to the other arrangement. Note that when portions of image data to be consecutively accessed each have the predetermined width in the Y direction, offset in the Y direction is desirably larger than the width. The same is true for the X direction.

Figure 12A:
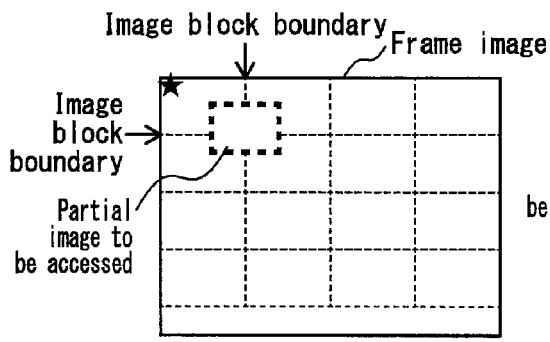
FIGS. 12A-12F show variations of arrangements.
Figure 12B:
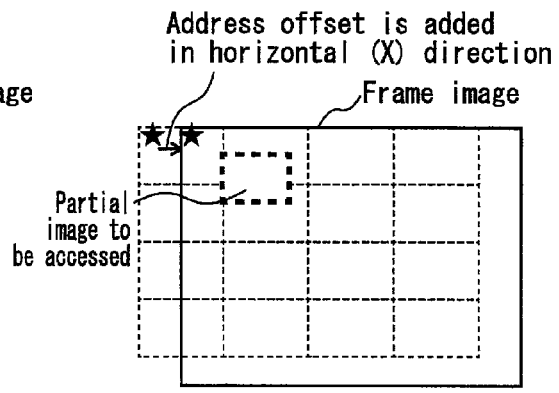
Figure 12C:
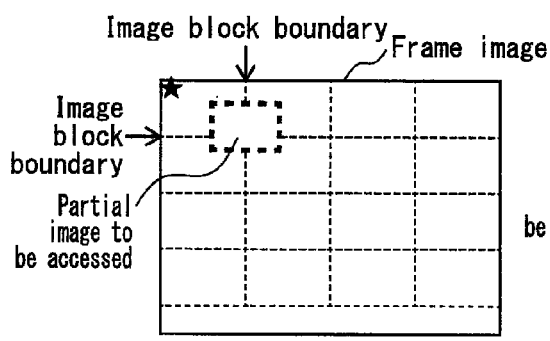
Figure 12D:
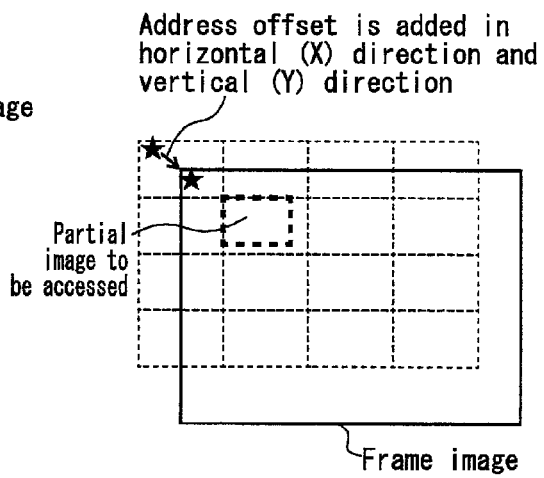

A plurality of arrangements may be determined so that the numbers of blocks included in address ranges of data to be accessed are different from each other. For example, a difference of offset between the arrangements in the two-dimensional address space may appear in the horizontal direction (X direction) (see FIGS. 12A and 12B), or in both of the horizontal direction (Y direction) and the vertical direction (X direction) (see FIGS. 12C and 12D).

Figure 12E:
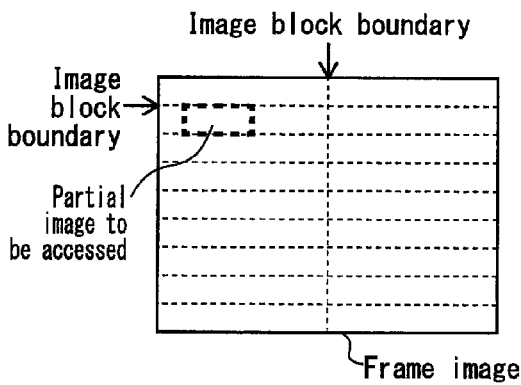
Figure 12F:
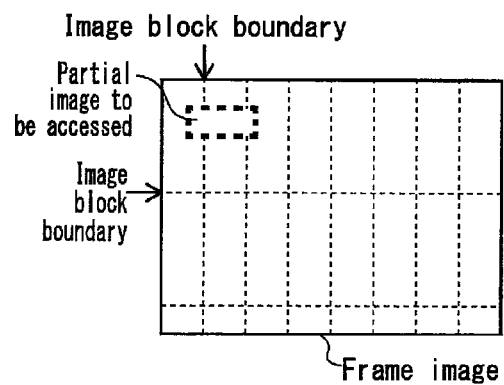

Alternatively, for each arrangement, the widths of an image block in the horizontal direction and the vertical direction may be different (see FIGS. 12E and 12F). For example, one of the two arrangements may use image blocks each consisting of 16 horizontal columns (128 bytes) and 32 vertical lines as shown in FIG. 4, and the other of the two arrangements may use image blocks each consisting of 8 horizontal columns (64 bytes) and 64 vertical lines.

(5) The above embodiment has described memory access performed during a procedure of MPEG encoding. However, processing for memory access is not limited to this, and may be encoding, decoding, processing according to H.264/MPEG AVC, or data encryption, data decryption and the like according to another standard.

(6) In the above embodiment, a frame image is mapped in the two-dimensional address space, but may be mapped in a general one-dimensional address space. However, it is useful to use the two-dimensional address space for mapping a two-dimensional image. Note that when an address space defined by one-dimensional addresses is used to map data such as characters or image data, the first arrangement and the second arrangement should be different from each other in terms of offsets (relative position) from the boundary addresses which are on the boundary of units of data amounts that can be stored in memory cells that can be accessed at the same row address in the same bank of the SDRAM. For example, if the unit corresponds to four kilobytes and data is mapped (logical addresses are determined) according to the first arrangement and the second arrangement to memory areas having different address ranges in the same logical address space, a difference between the start addresses of the two ranges having the same data should be other than multiples of 4000H.

Note that it is also possible to associate the memory 1000 and the memory 2000 described in the above embodiment to different address ranges in one logical address space.

(7) In address mapping according to the second arrangement shown in FIG. 5 in the above embodiment, a portion of the frame image mapped to the lowest image blocks in the vertical direction, i.e., (0, 34)-(14, 34), may be mapped to an empty space in the highest image blocks in the vertical direction, i.e., (0,0)-(14,0).

(8) In the above embodiment, the two different arrangements are used in determining addresses of the two-dimensional address space corresponding to blocks in the memories, based on addresses (coordinates) of images. Alternatively, two arrangements may be determined in directly specifying addresses such as banks, row addresses, column addresses of memory based on logical addresses of data such that relationship between the logical addresses and the row addresses are different from each other.

(9) One processor may realize all or part of functions of the calculator 200 by executing a control program. This control program may include program code written in machine language or a high-level language. The program may be recorded on a recording medium or transmitted and distributed via various communication channels. The recording medium may be any recording medium, such as an IC card, hard disk, optical disc, flexible disc, ROM, flash memory and so on. The distributed control program is to be stored in a processor-readable memory or the like, and the processor executes the control program. Each of the functions described in the above embodiment is thus realized. Note that the processor may directly execute the control program. Otherwise, the processor may execute the program after compiling or execute the program with use of an interpreter.

(10) The data sharing apparatus 100 described in the above embodiment or the calculators thereof may be configured as an integrated circuit package such as an IC, an LSI and the like. In addition, a memory may be included in the integrated circuit package. This package is incorporated into various apparatuses, which enables the various apparatuses to realize each of the functions described in the above embodiment.

(11) The modifications described above may be combined.

The structure and modifications of the data processing apparatus as an embodiment of the present invention, the data processing system, and the effects thereof are further discussed below.

Figure 13:
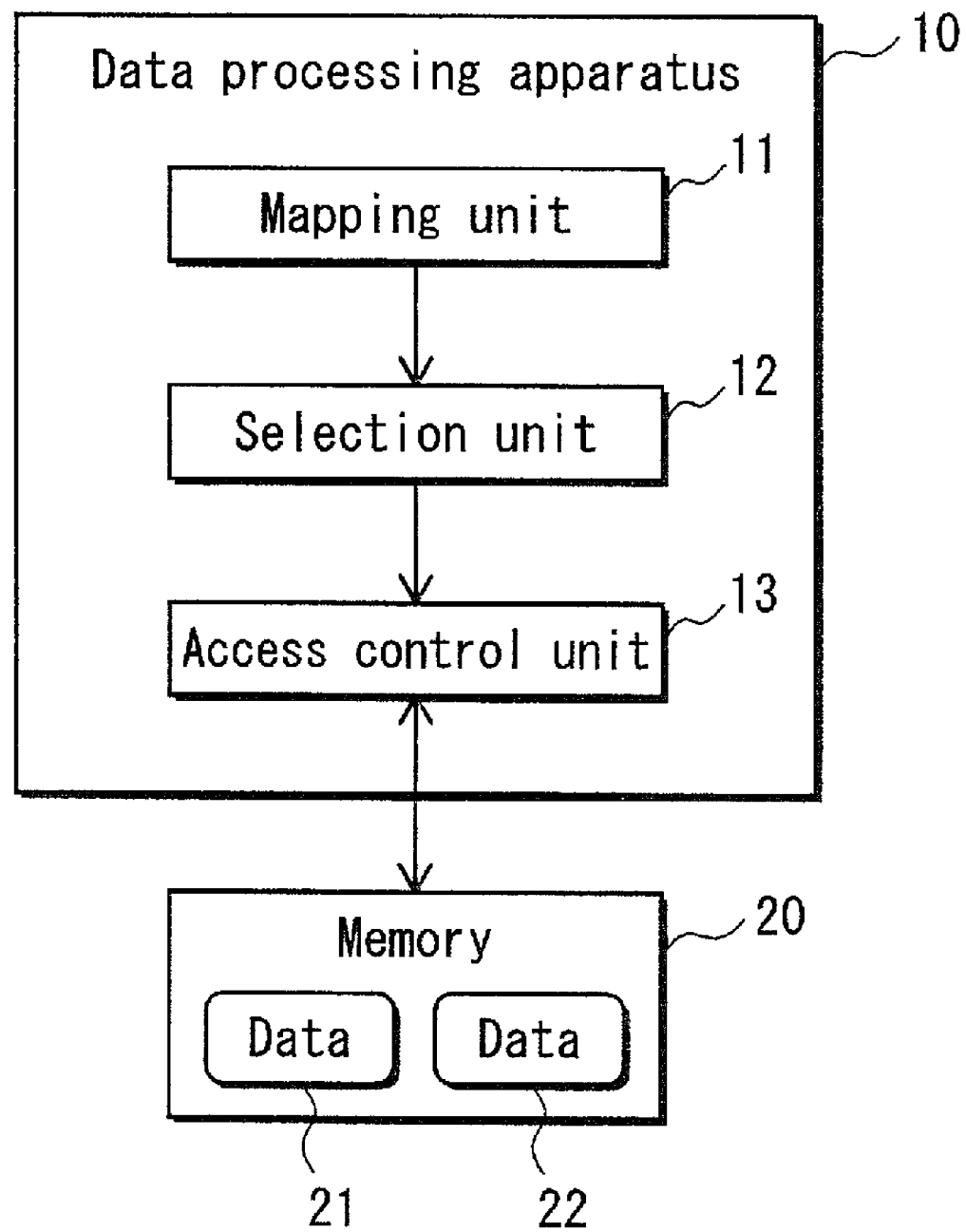
FIG. 13 is a functional block diagram of a data processing apparatus.

(a) The data processing apparatus pertaining to an embodiment of the present invention is, as shown in FIG. 13, a data processing apparatus for accessing data to be processed, the data being stored in a memory composed of a plurality of blocks in each of which continuous access is possible, the data processing apparatus comprising: a mapping unit configured to determine addresses according to a first arrangement and addresses according to a second arrangement, the addresses being for mapping the data to a plurality of areas defined in the memory according to the determined addresses; a selection unit configured to select one of the arrangements that is more efficient in accessing a portion to be read of the data, based on an address range corresponding to the portion of the data, the address range differing depending on which of the arrangements is selected; and an access control unit configured to perform control such that access to the portion of the data is realized by accessing, from among the plurality of areas in the memory, an area corresponding to the addresses determined according to the selected arrangement, the memory storing data that is same as the data to be processed in two different areas, one corresponding to the addresses determined according to the first arrangement, the other corresponding to the addresses determined according to the second arrangement, wherein the addresses determined according to the first arrangement and the addresses determined according to the second arrangement are different from each other in terms of relative positions with respect to boundary addresses of the blocks in an address space. Here, the blocks in each of which continuous access is possible are areas defined in the memory that can be continuously accessed using burst transmission or the like. Examples of such blocks include memory cells having the same row address in the same bank. These cells can be continuously accessed without a certain waiting time period due to the command issuance restriction in SDRAM, for example. With regard to access efficiency, for example, as a result of address mapping according to the two arrangements, one of the arrangement corresponding to less blocks that can be consecutively accessed is more efficiently accessed. In addition, a mapping unit 11 is equivalent to the above-described address specification unit 223 and the like. A selection unit 12 is equivalent to the above-described selection unit 223 and the like. An access control unit 13 is equivalent to the access control unit 221, the access conversion unit 222, the memory control unit 280 that have been described above and the like. Note that the data processing apparatus may be configured as an integrated circuit such as an LSI.

This data processing apparatus selects and accesses data mapped according to one of a plurality of different address mappings that is more efficient in consecutively reading and processing images or data such as characters, which are duplicately recorded according to the address mappings rather than the same address mapping. Therefore, efficient memory access can be expected as a whole.

(2) The data to be processed may be two-dimensional image data represented by x and y coordinates, and according to the first and second arrangements, the address space may be defined as an XY two-dimensional address space, and a plurality of image blocks corresponding one-to-one to the blocks in the memory are two-dimensionally mapped in the XY two-dimensional address space, and X and Y addresses of the two-dimensional image data may be determined based on the x and y coordinates of the two-dimensional image data so that X and Y addresses determined according to the first arrangement and X and Y addresses determined according to the second arrangement are different from each other in terms of relative positions with respect to boundaries of the image blocks in the XY two-dimensional address space. This improves memory access efficiency in processing such as MPEG encoding, i.e., in so-called motion estimation performed for estimating a portion of image, which is similar to a macroblock in frame images.

(c) The blocks in the memory that correspond to the image blocks may be memory cell groups, each memory cell group being composed of cells included in the same bank and having the same row address. This data processing apparatus can reduce consecutive access to areas specified by different row addresses in the same bank.

(d) The selection unit may select one of the first arrangement and the second arrangement according to which addresses are determined such that the number of image blocks included in the address range corresponding to the portion of the data is smaller. This allows for judgment of access efficiency with a simple structure.

(e) The data processing apparatus may consecutively read portions of a frame image that correspond to a plurality of positions defined in the frame image and each have a predetermined width in a y direction, and a difference between Y addresses of a portion of the data corresponding to a portion of the frame image determined according to the first arrangement and Y addresses of the same data as the portion of the data determined according to second arrangement may be greater than a width corresponding to the predetermined width in the y direction. According to this, in consecutively reading portions of the image, one of the arrangements allows each portion of image to be mapped so as not to occupy the address boundary in the Y direction of the image blocks in the address space. Therefore, the selected arrangement can improve access efficiency.

(f) The data processing apparatus may consecutively read portions of a frame image that correspond to a plurality of positions defined in the frame image and each have a predetermined width in an x direction, and a difference between X addresses of a portion of the data corresponding to a portion of the frame image determined according to the first arrangement and X addresses of the same data as the portion of the data determined according to second arrangement may be greater than a width corresponding to the predetermined width in the x direction. According to this, in consecutively reading portions of the image, one of the arrangements allows each portion of image to be mapped so as not to occupy the address boundary in the X direction of the image blocks in the address space. Therefore, the selected arrangement can improve access efficiency.

(g) According to the first and second arrangements, the image blocks may correspond one-to-one to all memory cell groups composed of cells included in the same bank and having the same row address in the memory, and the image blocks corresponding to the memory cell groups according to the first arrangement and the image blocks corresponding to the memory cell groups according to the second arrangement may be different from each other in terms of width in an X direction and width in a Y direction in the XY two-dimensional address space. The shapes of the image blocks included in rectangle images are different from each other in the address space corresponding to the blocks in each of which continuous access is possible in the memory. The two-dimensional image is then differently mapped with regard to the image blocks according to the arrangements. Since it is possible to select one that is more efficiently accessed, efficient memory access can be realized as a whole.

(h) The data processing apparatus may include the memory and further comprise: a recording unit configured to write the data to be processed in two different areas defined in the memory, one corresponding to addresses determined according to the first arrangement, the other corresponding to addresses determined according to the second arrangement. This structure realizes both of reading and writing of data within the data processing apparatus.

(i) The data to be processed may be a frame image, the data processing apparatus may consecutively read a plurality of portions of the data corresponding to a plurality of positions defined in the frame image, and the first and second arrangements may be determined such that among the positions corresponding to the portions of the data in the frame image, at least one portion to be read of the data is more efficiently accessed from areas corresponding to addresses determined according to the first arrangement and at least one portion to be read of the data is more efficiently accessed from areas corresponding to addresses determined according to the second arrangement. According to this, when it is necessary to consecutively access portions of the data (partial data) defined in various positions in frame image for so-called motion estimation and the like, a memory area that is more efficiently accessed can be accessed. As a result of this, access is performed not only on one of the two memory areas storing therein the same frame images, and access is consecutively and selectively performed on the two memory areas.

Figure 14:
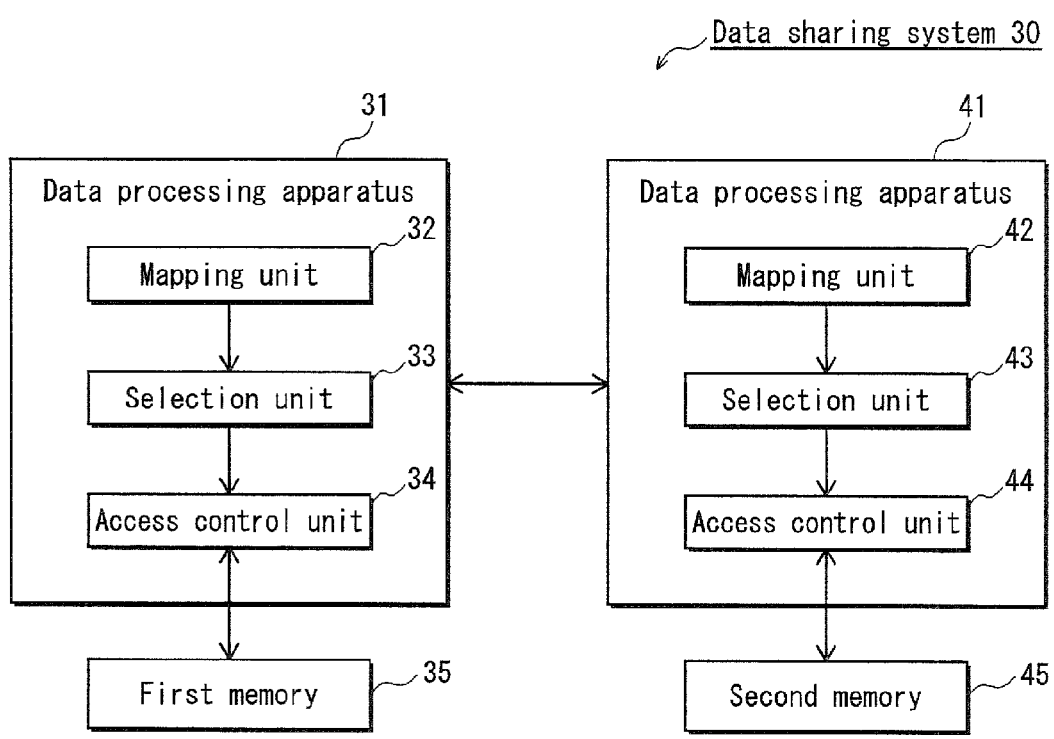
FIG. 14 is a functional block diagram of data sharing apparatuses.

(j) As shown in FIG. 14, a data sharing system pertaining to an embodiment of the present invention includes a first memory, a second memory, and first and second data processing apparatuses that access data to be processed, the data being stored in each of the memories, wherein each data processing apparatus comprises: a mapping unit configured to determine addresses for mapping the data in the first memory according to a first arrangement, and determine addresses for mapping the data in the second memory according to a second arrangement; a selection unit configured to select one of the arrangements that is more efficient in accessing a portion to be read of the data, based on an address range corresponding to the portion of the data, the address range differing depending on which of the arrangements is selected; and an access control unit configured to perform control such that access to the portion of the data is realized by accessing a memory area corresponding to the selected arrangement, wherein the addresses determined according to the first arrangement and the addresses determined according to the second arrangement are different from each other in terms of relative positions with respect to boundary addresses of the blocks in an address space, and the access control unit performs control such that when the data processing apparatus accesses the memory connected to another data processing apparatus, the access is realized via the said another data processing apparatus. The data sharing system including multiple processors each connected to a memory can realize efficient memory access.

The data processing apparatus pertaining to the present invention can realize efficient memory access, and accordingly is useful as an apparatus for processing data such as video and still images with use of SDRAMs.

REFERENCE SIGNS LIST 10, 31, 41 data processing apparatus
11, 32, 42 mapping unit
12, 33, 43 selection unit
13, 34, 44 access control unit
20, 1000, 2000 memory
30 data sharing system
35 first memory
45 second memory
100 data sharing apparatus
200, 300 calculator
210, 310 processor
220, 320, 400 access management unit
221 access control unit
222 access conversion unit
223 address specification unit
230 access analysis unit
231 access attribute determination unit
232 access division unit
233 selection unit
240, 241, 340, 341, 410 arbitration unit
250, 350 input management unit
260, 360 output management unit
270, 370 interface
280, 380 memory control unit
290, 390 access conversion unit

We claim:

1. A data processing apparatus for accessing data to be processed, the data being stored in a memory composed of a plurality of blocks in each of which continuous access is possible, the data processing apparatus comprising:
a mapping unit configured to determine addresses according to a first arrangement and addresses according to a second arrangement, the addresses being for mapping the data to a plurality of areas defined in the memory according to the determined addresses;
the memory including:
a first area storing the data to be processed at an address determined according to the first arrangement, in a two-dimensional first address space; and
a second area storing data that is the same as the data to be processed at an address determined according to the second arrangement, in a two-dimensional second address space;
a selection unit configured to select one of the arrangements that is more efficient in accessing a portion to be read of the data, based on an address range corresponding to the portion of the data, the address range differing depending on which of the arrangements is selected; and
an access control unit configured to perform control such that access to the portion of the data is realized by accessing, from among the plurality of areas in the memory, the first area and the second area corresponding to the addresses determined according to the selected arrangement, the memory storing data that is same as the data to be processed in the first area and the second area corresponding to the addresses determined according to the first arrangement and the addresses determined according to the second arrangement, wherein
the addresses determined according to the first arrangement and the addresses determined according to the second arrangement are different from each other in terms of relative positions with respect to boundary addresses of the blocks in each address space, wherein
the data to be processed is two-dimensional image data,
the first arrangement and the second arrangement map the two-dimensional image data in a two-dimensional space,
an address in the X direction of a pixel of the two-dimensional image data in the second address space is offset from an address in the X direction of a pixel of the two-dimensional image data in the first address space, or an address in the Y direction of a pixel of the two-dimensional image data in the second address space is offset from as address in the Y direction of a pixel of the two-dimensional image data in the first address space, and the blocks in the memory are memory cell groups, each memory cell group being composed of cells included in the same bank and having the same row address.

2. The data processing apparatus of claim 1, wherein
the data to be processed is two-dimensional image data represented by x and y coordinates, and
according to the first and second arrangements, the first address space and the second address space are each defined as an XY two-dimensional address space, and a plurality of image blocks corresponding one-to-one to the blocks in the memory are two-dimensionally mapped in the first address space and the second address space, and X and Y addresses of the two-dimensional image data are determined based on the x and y coordinates of the two-dimensional image data so that X and Y addresses determined according to the first arrangement and X and Y addresses determined according to the second arrangement are different from each other in terms of relative positions with respect to boundaries of the image blocks in each address space.

3. The data processing apparatus of claim 2, wherein
the blocks in the memory that correspond to the image blocks are memory cell groups, each memory cell group being composed of cells included in the same bank and having the same row address.

4. The data processing apparatus of claim 3, wherein
the selection unit selects one of the first arrangement and the second arrangement according to which addresses are determined such that the number of image blocks included in the address range corresponding to the portion of the data is smaller.

5. The data processing apparatus of claim 4, wherein
the data processing apparatus consecutively reads portions of a frame image that correspond to a plurality of positions defined in the frame image and each have a predetermined width in a y direction, and
a difference between Y addresses of a portion of the data corresponding to a portion of the frame image determined according to the first arrangement and Y addresses of the same data as the portion of the data determined according to second arrangement is greater than a width corresponding to the predetermined width in the y direction.

6. The data processing apparatus of claim 4, wherein
the data processing apparatus consecutively reads portions of a frame image that correspond to a plurality of positions defined in the frame image and each have a predetermined width in an x direction, and
a difference between X addresses of a portion of the data corresponding to a portion of the frame image determined according to the first arrangement and X addresses of the same data as the portion of the data determined according to second arrangement is greater than a width corresponding to the predetermined width in the x direction.

7. The data processing apparatus of claim 4, wherein
according to the first and second arrangements, the image blocks correspond one-to-one to all memory cell groups composed of cells included in the same bank and having the same row address in the memory, and the image blocks corresponding to the memory cell groups according to the first arrangement and the image blocks corresponding to the memory cell groups according to the second arrangement are different from each other in terms of width in an X direction and width in a Y direction in each address space.

8. The data processing apparatus of claim 4, further comprising:
a recording unit configured to write the data to be processed in the first area and the second area defined in the memory, one corresponding to addresses determined according to the first arrangement, the other corresponding to addresses determined according to the second arrangement.

9. The data processing apparatus of claim 1, wherein
the data to be processed is a frame image,
the data processing apparatus consecutively reads a plurality of portions of the data corresponding to a plurality of positions defined in the frame image, and
the first and second arrangements are determined such that among the positions corresponding to the portions of the data in the frame image, at least one portion to be read of the data is more efficiently accessed from the first area corresponding to addresses determined according to the first arrangement and at least one portion to be read of the data is more efficiently accessed from the second area corresponding to addresses determined according to the second arrangement.

10. A data processing apparatus for accessing data to be processed, the data being stored in a memory composed of a plurality of blocks in each of which continuous access is possible, wherein,
the data to be processed is subject to address mapping according to a plurality of arrangements such that, for each arrangement, a relative positional relationship between an address range to which the data to be processed is mapped and boundary addresses of the blocks is different from one another in an address space,
the data processing apparatus includes a selection unit configured to select one of the arrangements that is more efficient in accessing a portion to be read of the data, based on an address range corresponding to the portion of the data subject to address mapping, and an access control unit configured to perform control such that access to the portion of the data is realized by accessing an area corresponding to the selected arrangement,
the memory includes:
a first area storing the data to be processed at an address determined according to the first arrangement, in a two-dimensional first address space; and
a second area storing data that is same as the data to be processed at an address determined according to the second arrangement, in a two-dimensional second address space,
the data to be processed is two-dimensional image data,
among the plurality of arrangements, a first arrangement and a second arrangement map the two-dimensional image data in a two-dimensional space,
an address in the X direction of a pixel of the two-dimensional image data in the second address space is offset from an address in the X direction of a pixel of the two-dimensional image data in the first address space, or an address in the Y direction of a pixel of the two-dimensional image data in the second address space is offset from as address in the Y direction of a pixel of the two-dimensional image data in the first address space, and
the blocks in the memory are memory cell groups, each memory cell group being composed of cells included in the same ba nk and having the same row address.

11. A data sharing system including a first memory, a second memory, and first and second data processing apparatuses that access data to be processed, the data being stored in each of the memories, wherein
each data processing apparatus comprises:
a mapping circuit that determines addresses for mapping the data in the first memory according to a first arrangement, and determines addresses for mapping the data in the second memory according to a second arrangement;
each memory includes:
a first area storing the data to be processed at an address determined according to the first arrangement, in a two-dimensional first address space; and
a second area storing data that is same as the data to be processed at an address determined according to the second arrangement, in a two-dimensional second address space;
a selection circuit that selects one of the arrangements that is more efficient in accessing a portion of the data to be read, based on an address range corresponding to the portion of the data, the address range differing depending on which of the arrangements is selected; and
an access control circuit that performs control such that access to the portion of the data is realized by accessing a memory area in each memory including the first area and the second area corresponding to the selected arrangement, wherein
the addresses determined according to the first arrangement and the addresses determined according to the second arrangement are different from each other in terms of relative positions with respect to boundary addresses of the blocks in each address space, and
the access control circuit performs control such that when the data processing apparatus accesses the memory connected to another data processing apparatus, the access is realized via the other data processing apparatus, and wherein
the data to be processed is two-dimensional image data,
the first arrangement and the second arrangement map the two-dimensional image data in a two-dimensional space,
an address in the X direction of a pixel of the two-dimensional image data in the second address space is offset from an address in the X direction of a pixel of the two-dimensional image data in the first address space, or an address in the Y direction of a pixel of the two-dimensional image data in the second address space is offset from as address in the Y direction of a pixel of the two-dimensional image data in the first address space, and
the blocks in the memory are memory cell groups, each memory cell group being composed of cells included in the same bank and having the same row address.

12. The data sharing system of claim 11, wherein
the data to be processed is two-dimensional image data represented by x and y coordinates, and
according to the first and second arrangements, the first address space and the second address space are each defined as an XY two-dimensional address space, and a plurality of image blocks corresponding one-to-one to the blocks in the memory are two-dimensionally mapped in the first address space and the second address space, and X and Y addresses of the two-dimensional image data are determined based on the x and y coordinates of the two-dimensional image data so that X and Y addresses determined according to the first arrangement and X and Y addresses determined according to the second arrangement are different from each other in terms of relative positions with respect to boundaries of the image blocks in each address space.

13. The data sharing system of claim 12, wherein
the selection circuit selects one of the first arrangement and the second arrangement according to which addresses are determined such that the number of image blocks included in the address range corresponding to the portion of the data is smaller.

14. A data processing method used by a data processing apparatus for accessing data to be processed, the data being stored in a memory composed of a plurality of blocks in each of which continuous access is possible, the data processing method comprising the steps of:
determining addresses according to a first arrangement and addresses according to a second arrangement, the addresses being for mapping the data to a plurality of areas defined in the memory according to the determined addresses, the memory including a first area storing the data to be processed at an address determined according to the first arrangement, in a two-dimensional first address space; and a second area storing data that is the same as the data to be processed at an address determined according to the second arrangement, in a two-dimensional second address space;
selecting one of the arrangements that is more efficient in accessing a portion of the data to be read, based on an address range corresponding to the portion of the data, the address range differing depending on which of the arrangements is selected; and
performing control such that access to the portion of the data is realized by accessing, from among the plurality of areas in the memory, the first area and the second area corresponding to the addresses determined according to the selected arrangement, the memory storing data that is same as the data to be processed in the first area and the second area corresponding to the addresses determined according to the first arrangement and the addresses determined according to the second arrangement, wherein
the addresses determined according to the first arrangement and the addresses determined according to the second arrangement are different from each other in terms of relative positions with respect to boundary addresses of the blocks in each address space, and wherein
the data to be processed is two-dimensional image data,
the first arrangement and the second arrangement map the two-dimensional image data in a two-dimensional space,
an address in the X direction of a pixel of the two-dimensional image data in the second address space is offset from an address in the X direction of a pixel of the two-dimensional image data in the first address space, or an address in the Y direction of a pixel of the two-dimensional image data in the second address space is offset from as address in the Y direction of a pixel of the two-dimensional image data in the first address space, and
the blocks in the memory are memory cell groups, each memory cell group being composed of cells included in the same bank and having the same row address.

15. An integrated circuit having a function of accessing data to be processed, the data being stored in a memory composed of a plurality of blocks in each of which continuous access is possible, the integrated circuit being configured to:

determine addresses according to a first arrangement and addresses according to a second arrangement, the addresses being for mapping the data to a plurality of areas defined in the memory according to the determined addresses, the memory including a first area storing the data to be processed at an address determined according to the first arrangement, in a two-dimensional first address space; and a second area storing data that is the same as the data to be processed at an address determined according to the second arrangement, in a two-dimensional second address space;

select one of the arrangements that is more efficient in accessing a portion the data to be read, based on an address range corresponding to the portion of the data, the address range differing depending on which of the arrangements is selected; and perform control such that access to the portion of the data is realized by accessing, from among the plurality of areas in the memory, the first area and the second area corresponding to the addresses determined according to the selected arrangement, the memory storing data that is same as the data to be processed in the first area and the second area corresponding to the addresses determined according to the first arrangement and the addresses determined according to the second arrangement, wherein the addresses determined according to the first arrangement and the addresses determined according to the second arrangement are different from each other in terms of relative positions with respect to boundary addresses of the blocks in each address space, and wherein the data to be processed is two-dimensional image data, the first arrangement and the second arrangement map the two-dimensional image data in a two-dimensional space, an address in the X direction of a pixel of the two-dimensional image data in the second address space is offset from an address in the X direction of a pixel of the two-dimensional image data in the first address space, or an address in the Y direction of a pixel of the two-dimensional image data in the second address space is offset from as address in the Y direction of a pixel of the two-dimensional image data in the first address space, and the blocks in the memory are memory cell groups, each memory cell group being composed of cells included in the same bank and having the same row address.

* * * * *